United States Patent
Chen et al.

(10) Patent No.: US 11,886,036 B2
(45) Date of Patent: Jan. 30, 2024

(54) VARIABLE FOCUS ASSEMBLIES AND APPARATUSES HAVING CROSSED BEARING BALLS

(71) Applicant: Hand Held Products, Inc., Charlotte, NC (US)

(72) Inventors: Feng Chen, Mount Laurel, NJ (US); Gregory Rueblinger, Mount Laurel, NJ (US); Tao Xian, Mount Laurel, NJ (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 365 days.

(21) Appl. No.: 17/157,986

(22) Filed: Jan. 25, 2021

(65) Prior Publication Data

US 2022/0236514 A1     Jul. 28, 2022

(51) Int. Cl.
*G02B 7/09*     (2021.01)
*G02B 7/02*     (2021.01)
*G03B 17/12*     (2021.01)

(52) U.S. Cl.
CPC .............. *G02B 7/09* (2013.01); *G02B 7/021* (2013.01); *G03B 17/12* (2013.01)

(58) Field of Classification Search
CPC .. G03B 5/00; G03B 13/36; G03B 2205/0007; G03B 2205/0053; G03B 2205/0069; G03B 3/02; G03B 3/10; G03B 5/04; G03B 30/00; G02B 7/021; G02B 7/08; G02B 7/09; G02B 7/10; G02B 9/62; G02B 13/001;

(Continued)

(56) References Cited

U.S. PATENT DOCUMENTS 9,134,503 B2   9/2015   Topliss
10,036,896 B2   7/2018   Hee et al.
(Continued)

FOREIGN PATENT DOCUMENTS

CN    110908067 A    3/2020
EP    3862803 A1    8/2021
(Continued)

OTHER PUBLICATIONS

English Translation of JP Office Action dated Dec. 7, 2022 for JP Application No. 2022005668.
(Continued)

*Primary Examiner* — Marin Pichler
(74) *Attorney, Agent, or Firm* — Alston & Bird LLP

(57) ABSTRACT

Various embodiments described herein provide a variable focus lens assembly. Some embodiments are designed to enable repositioning of one or more components, such as a lens barrel assembly, to adjust the focus of the variable focus lens assembly. Some example variable focus lens assemblies include a module base housing a lens barrel assembly having a pair of positioning magnets, a pair of positioning coil assemblies associated with the positioning magnets, and at least one pair of bearing balls movably supporting the lens barrel assembly. The positioning coil assemblies together with the positioning magnets are configured to exert various magnetic fields to reposition the lens barrel assembly. Further embodiments are provided for imaging apparatus including at least one variable focus lens assembly described herein.

11 Claims, 19 Drawing Sheets

(58) Field of Classification Search
CPC ............. G02B 13/0065; G02B 27/646; H04N 5/2253; H04N 5/2254; H04N 5/2257; H04N 5/23287; H02K 11/33; H02K 41/035
USPC ....... 359/911, 554, 555, 557, 811, 813, 814, 359/824, 872, 877
See application file for complete search history.

(56) References Cited

U.S. PATENT DOCUMENTS

| | | |
|---|---|---|
| 2007/0035628 A1 | 2/2007 | Kanai |
| 2007/0047942 A1 | 3/2007 | Chang et al. |
| 2008/0266684 A1 | 10/2008 | Chang |
| 2012/0237147 A1 | 9/2012 | Utz |
| 2015/0296143 A1 | 10/2015 | Kang et al. |
| 2015/0373272 A1 | 12/2015 | Lim et al. |
| 2016/0252702 A1 | 9/2016 | Tsuchiya et al. |
| 2018/0364450 A1 | 12/2018 | Lee et al. |
| 2019/0196137 A1* | 6/2019 | Ushioda ............... G02B 27/646 |
| 2020/0341350 A1 | 10/2020 | Tseng et al. |
| 2021/0231904 A1* | 7/2021 | Son ........................ G03B 3/10 |
| 2021/0239932 A1 | 8/2021 | Feng et al. |
| 2021/0382262 A1 | 12/2021 | Wu et al. |
| 2022/0046151 A1 | 2/2022 | Shabtay et al. |

FOREIGN PATENT DOCUMENTS

| | | |
|---|---|---|
| JP | 2007-074696 A | 3/2007 |
| JP | 2010-068635 A | 3/2010 |
| JP | 2012-093558 A | 5/2012 |
| JP | 3200481 U | 10/2015 |
| WO | 2020/013465 A1 | 1/2020 |
| WO | 2020/027588 A1 | 2/2020 |

OTHER PUBLICATIONS

European search report and Search opinion dated Dec. 20, 2022 for EP Application No. 22152327.7.
European search report dated Dec. 20, 2022 for EP Application No. 22152327.
JP Office Action dated Dec. 7, 2022 for JP Application No. 2022005668.
English Translation of JP Office Action dated Apr. 5, 2023 for JP Application No. 2022005668, 5 page(s).
JP Office Action dated Apr. 5, 2023 for JP Application No. 2022005668, 7 page(s).
English Translation of JP Notice of Allowance, including Search Report dated May 29, 2023 for JP Application No. 2022005668, 2 page(s).
JP Notice of Allowance, including Search Report dated May 29, 2023 for JP Application No. 2022005668, 3 page(s).
Extended European Search Report dated Jul. 21, 2023 for EP Application No. 23158736, 7 page(s).

* cited by examiner

VARIABLE FOCUS ASSEMBLIES AND APPARATUSES HAVING CROSSED BEARING BALLS

TECHNOLOGICAL FIELD

Embodiments of the present disclosure generally relate to lens focusing assemblies for imaging apparatuses, and specifically to variable focus lens assemblies for use in small form factor imaging apparatuses and configured for variable focus using electromagnetism.

BACKGROUND

In imaging apparatuses, lenses are often designed and arranged such that objects at a particular predetermined range appear in focus via the lens. An image sensor is utilized to capture image data representing a field of view via the lens. Oftentimes when an object to be imaged is out of focus of the lens, the lens needs to be moved to one or more other focal positions to bring the object in focus.

BRIEF SUMMARY

In general, embodiments of the present disclosure provided herein include optical assemblies, variable focus lens assemblies and variable focus imaging apparatuses including one or more such assemblies. Other implementations for one or more of the variable focus lens assemblies and/or variable focus imaging apparatuses will be, or will become, apparent to one with skill in the art upon examination of the following figures and detailed description. It is intended that all such additional implementations be included within this description be within the scope of the disclosure and be protected by the following claims.

In accordance with one aspect of the present disclosure, an optical assembly is provided. The optical assembly comprises a housing, an optical member, a first pair of bearing balls, and a second pair of bearing balls. The optical member is configured to move within the housing and has two front tubular slots and two rear tubular slots. Each ball bearing of the first pair of bearing balls is housed in a respective one of the two front tubular slots and is configured to movably support the optical member within the housing at a first side of the optical member. Each ball bearing of the second pair of bearing balls is housed in a respective one of the two rear tubular slots and is configured to movably support the optical member within the housing at a second side of the optical member.

Additionally or alternatively, in at least some embodiments of the optical assembly, each of the two front tubular slots are diagonally opposite to each other on the first side of the optical member. Additionally or alternatively, in at least some embodiments of the optical assembly, each of the two rear tubular slots are diagonally opposite to each other on the second side of the optical member.

Additionally or alternatively, in at least some embodiments of the optical assembly, the optical assembly further comprises a wired coil board configured to produce a magnetic flux upon energization. Additionally or alternatively, the optical member further comprises at least one permanent magnet on at least a portion of the optical member such that at all movement positions of the optical member, the at least one permanent magnet is in interactable proximity of the magnetic flux produced by the wired coil board.

Additionally or alternatively, in at least some embodiments of the optical assembly, the wired coil board comprises a wired coil assembly configured to move at least a part of the optical member within a recessed portion defined by the wired coil board, based on a first current supplied to the wired coil assembly.

Additionally or alternatively, in at least some embodiments of the optical assembly, the wired coil board comprises a wired coil assembly configured to move at least a part of the optical member out of a recessed portion defined by the wired coil board, based on a second current supplied to the wired coil assembly.

Additionally or alternatively, in at least some embodiments of the optical assembly, a first end of the housing is towards a front side of the optical assembly that faces a scene to be imaged and a second end of the housing is towards a rear end of the optical assembly that faces an image sensor, and wherein the wired coil board is positioned towards the rear end of the optical assembly.

Additionally or alternatively, in at least some embodiments of the optical assembly, the wired coil board comprises a wired coil assembly configured to move the optical member upon energization and wherein the movement of the optical member varies a focus of the optical assembly.

Additionally or alternatively, in at least some embodiments of the optical assembly, the wired coil assembly is configured to exert an electromagnetic force on the optical member to move the optical member along a direction parallel to an optical axis of the optical assembly.

Additionally or alternatively, in at least some embodiments of the optical assembly, the optical assembly further comprises a wired coil board having a first set of windings and a second set of windings. Additionally or alternatively, in at least some embodiments of the optical assembly, the first set of windings and the second set of windings define a recessed portion therebetween to accommodate a rear portion of the optical member. Additionally or alternatively, in at least some embodiments of the optical assembly, a first plane containing the first set of windings is parallel to a second plane containing the second set of windings and an optical axis of the optical assembly bisects a line joining centers of the first plane and the second plane.

Additionally or alternatively, in at least some embodiments of the optical assembly, the optical member further comprises a first permanent magnet and a second permanent magnet placed diagonally opposite to the first permanent magnet.

In accordance with one aspect of the present disclosure, a variable focus lens assembly is provided. The variable focus lens assembly is configured to position at least a lens barrel assembly to a predefined number of focal positions, and/or within a continuous set of focal positions, with reduced form factor such that the assembly may fit within a small form factor apparatus chassis. In at least one example embodiment, an example variable focus lens assembly comprises a positioning coil board comprising at least a first positioning coil assembly and a second positioning coil assembly. The example variable focus lens further comprises a lens barrel assembly. The example variable focus lens further comprises a module base defining an inner module space designed to fit the lens barrel assembly, where the module base is designed to support the first positioning coil assembly at a first coil position and the second positioning coil assembly at a second coil position, the first coil position being opposite to the second coil position. The example variable focus lens further comprises at least one pair of bearing balls engaged with the module base and the lens barrel assembly, where the first positioning coil assembly, the second positioning coil assembly and the at least one pair of bearing balls, together with the lens barrel assembly, define a focus position for the lens barrel assembly.

Additionally or alternatively, in at least some embodiments of the variable focus lens assembly, the first positioning coil assembly comprises a first positioning coil. The first positioning coil is positioned around a first positioning pad, and the second positioning coil assembly comprises a second positioning coil, where the second positioning coil is positioned around a second positioning pad. The lens barrel assembly comprises a first positioning magnet located adjacent to the first positioning pad, a second positioning magnet located adjacent to the second positioning pad, and an imaging optical lens, wherein the first positioning pad, the first positioning coil, and the first positioning magnet the second positioning pad, the second positioning coil, and the second positioning magnet and the at least one pair of bearing balls define the focus position for the lens barrel assembly.

Additionally or alternatively, in at least some such embodiments of the variable focus lens assembly, the at least one pair of bearing balls comprises a first pair of bearing balls and a second pair of bearing balls. Additionally or alternatively, the module base and the lens barrel assembly each comprise at least two bearing slots, each bearing slot designed to enable a ball bearing of the corresponding pair of bearing balls to engage each of the module base and the lens barrel assembly through the corresponding bearing slot.

Additionally or alternatively, in at least some such embodiments of the variable focus lens assembly, the module base and the lens barrel assembly each comprise a first bearing slot and a second bearing slot, each of the first bearing slots located opposite to one of the second bearing slots. Additionally or alternatively, the at least one pair of bearing balls comprises a first pair of bearing balls and a second pair of bearing balls. Each ball bearing of the first pair of bearing balls is engaged with the module base and the lens barrel assembly via each of the first bearing slots and each ball bearing of the second pair of bearing balls is engaged with the module base and the lens barrel assembly via each of the second bearing slots.

Additionally or alternatively, in at least some such embodiments of the variable focus lens assembly, the focus position for the lens barrel assembly comprises a first focus position in a circumstance where the positioning coil board is in a first powered state, a second focus position in a circumstance where the positioning coil board is in a second powered state, and a default focus position in a circumstance where the positioning coil board is in a non-powered state.

Additionally or alternatively, in at least some such embodiments of the variable focus lens assembly, the focus position for the lens barrel assembly comprises a default focus position in a circumstance where the positioning coil board is in a non-powered state, and the first positioning pad is aligned with the first positioning magnet and the second positioning pad is aligned with the second positioning magnet at the default focus position. Additionally or alternatively, in at least some such embodiments of the variable focus lens assembly, the default focus position is based on a default focus range.

In accordance with another aspect of the present disclosure, a multi-sensor imaging apparatus is provided. The multi-sensor imaging apparatus is configured for variable focus as disclosed herein. The multi-sensor imaging apparatus comprises a variable focus lens assembly, at least one additional lens assembly, and an apparatus chassis configured to house at least the variable focus lens assembly and the at least one additional lens assembly. The variable focus lens assembly of the multi-sensor imaging apparatus comprises a first positioning coil assembly comprising a first positioning coil, where the first positioning coil is positioned around a first positioning pad. The variable focus lens assembly of the multi-sensor imaging apparatus further comprises a second positioning coil assembly comprising a second positioning coil, where the second positioning coil is positioned around a second positioning pad. The variable focus lens assembly of the multi-sensor imaging apparatus further comprises a lens barrel assembly comprising first positioning magnet located adjacent to the first positioning pad, a second positioning magnet located adjacent to the second positioning pad, and an imaging optical lens. The variable focus lens assembly of the multi-sensor imaging apparatus further comprises a module base defining an inner module space designed to fit the lens barrel assembly, and the module base is designed to support the first positioning coil assembly at a first coil position and the second positioning coil assembly at a second coil position, the first coil position opposite the second coil position, the first coil position being diagonally opposite to the second coil position. The variable focus lens assembly of the multi-sensor imaging apparatus further comprises at least one pair of bearing balls engaged with the module base and the lens barrel assembly. The first positioning coil assembly and the first positioning magnet together with the second positioning coil assembly and the second positioning magnet and the at least one pair of bearing balls define a focus position for the lens barrel assembly.

Additionally or alternatively, in at least some such embodiments of the multi-sensor imaging apparatus, the module base and the lens barrel assembly each comprise a first bearing slot and a second bearing slot, each of the first bearing slots located opposite to one of the second bearing slots. Additionally or alternatively, the at least one pair of bearing balls comprises a first pair of bearing balls and a second pair of bearing balls. The first pair of bearing balls is engaged with the module base and the lens barrel assembly via each of the first bearing slots, and the second pair of bearing balls is engaged with the module base and the lens barrel assembly via each of the second bearing slots.

Additionally or alternatively, in at least some such embodiments of the multi-sensor imaging apparatus, the multi-sensor imaging apparatus further comprises a first image sensor and at least one second image sensor. The first image sensor is positioned along an optical axis of the variable focus lens assembly and the at least one second image sensor is positioned along an optical axis of the at least one additional lens assembly.

BRIEF DESCRIPTION OF THE DRAWINGS

Figure 1A:
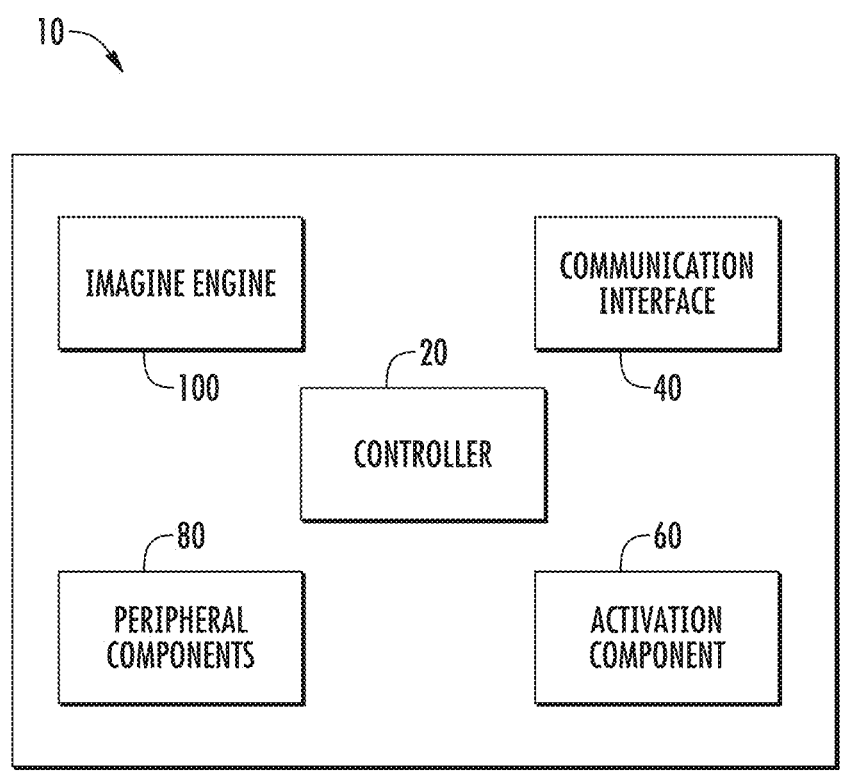
Figure 1B:
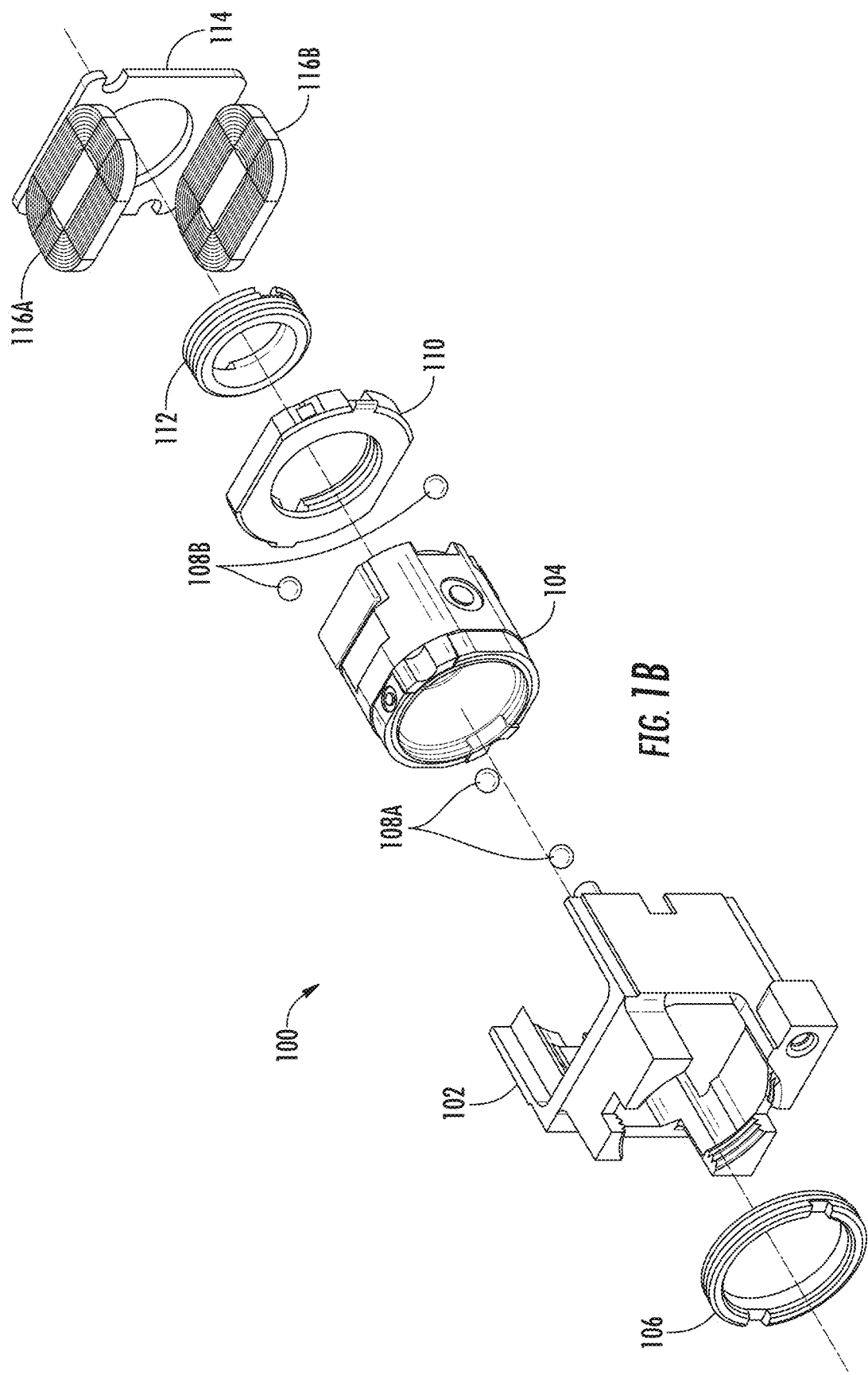
Figure 3A:
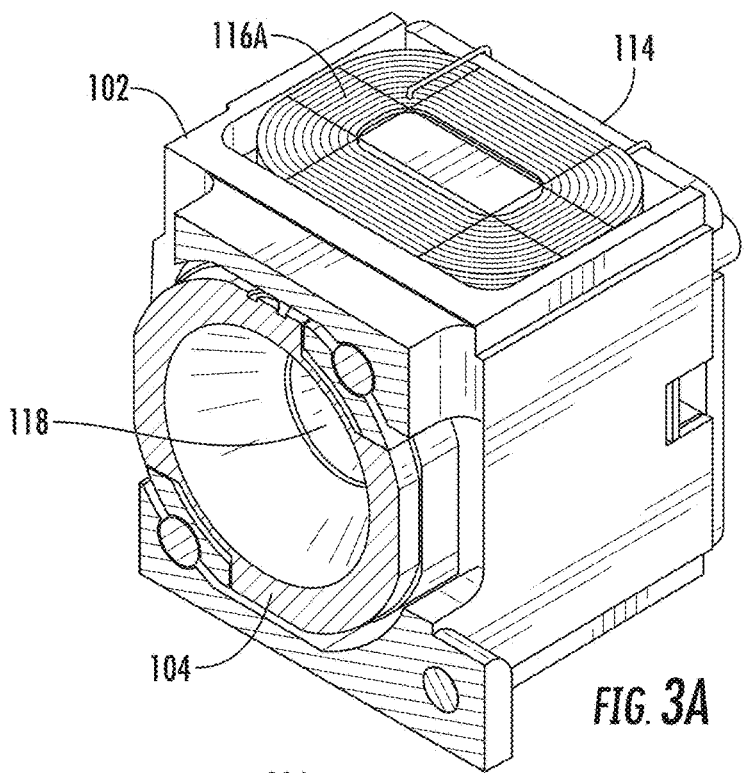
Figure 3B:
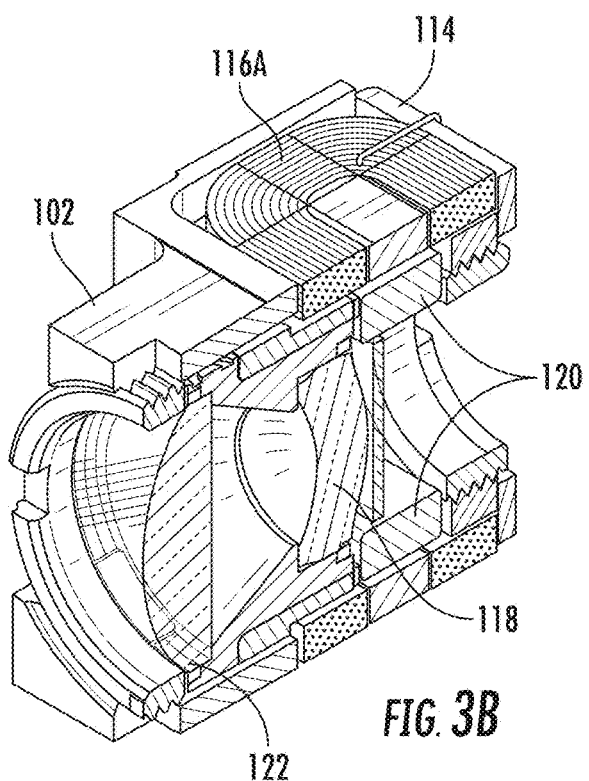
Figure 3C:
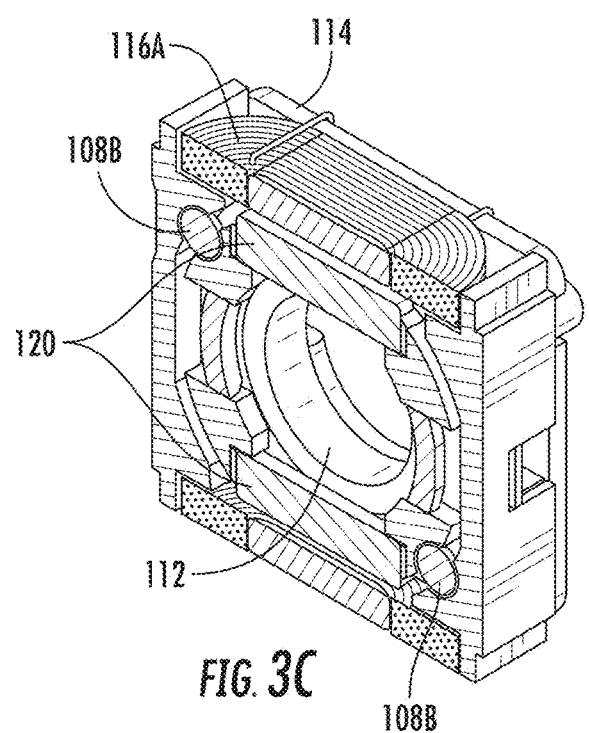
Figure 4A:
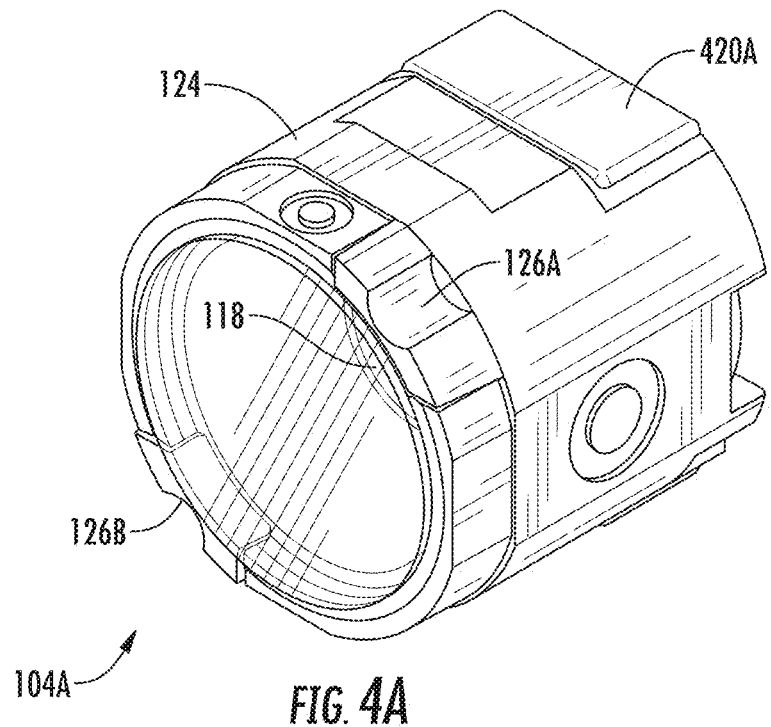
Figure 4B:
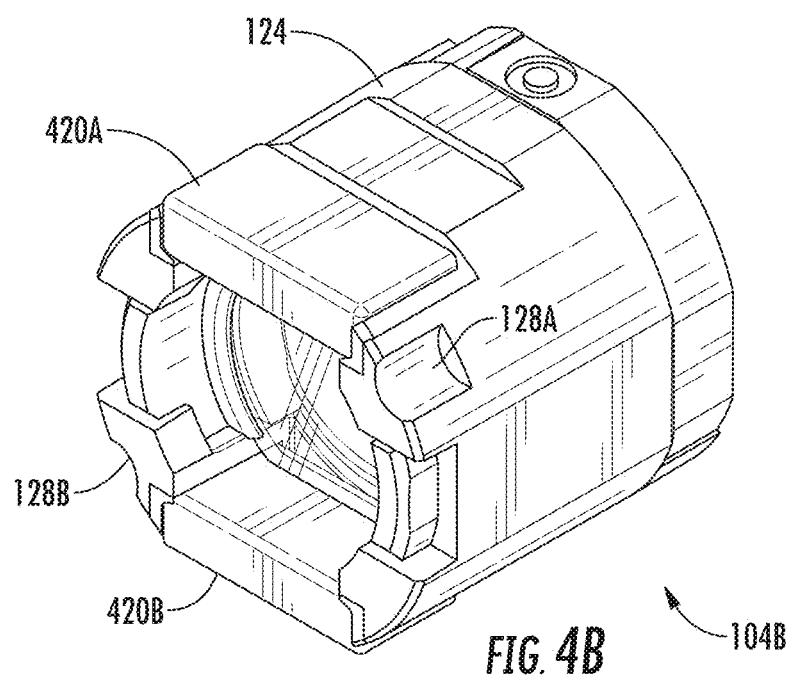
Figure 5A:
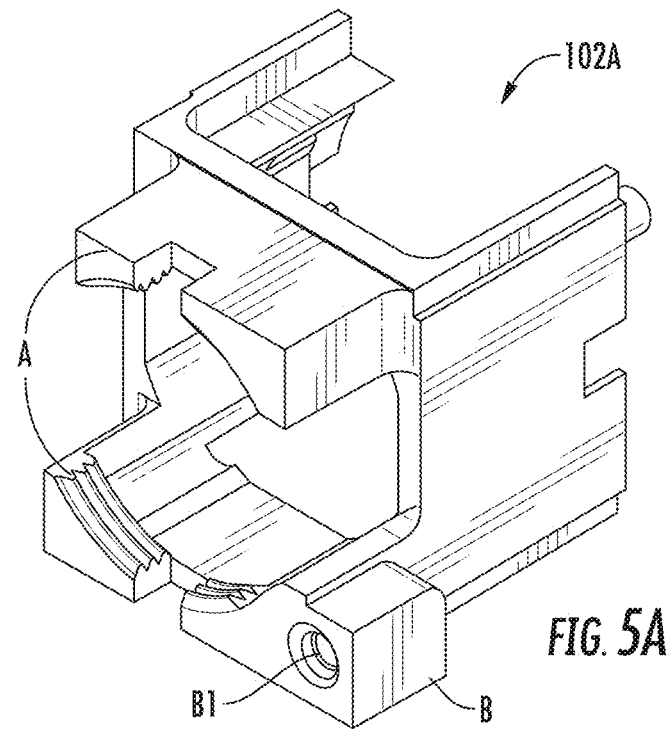
Figure 5B:
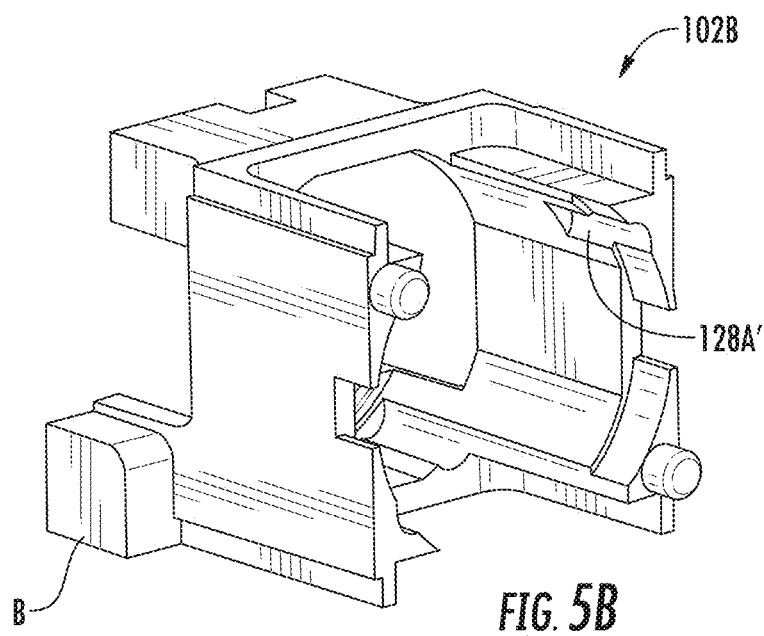
Figure 5C:
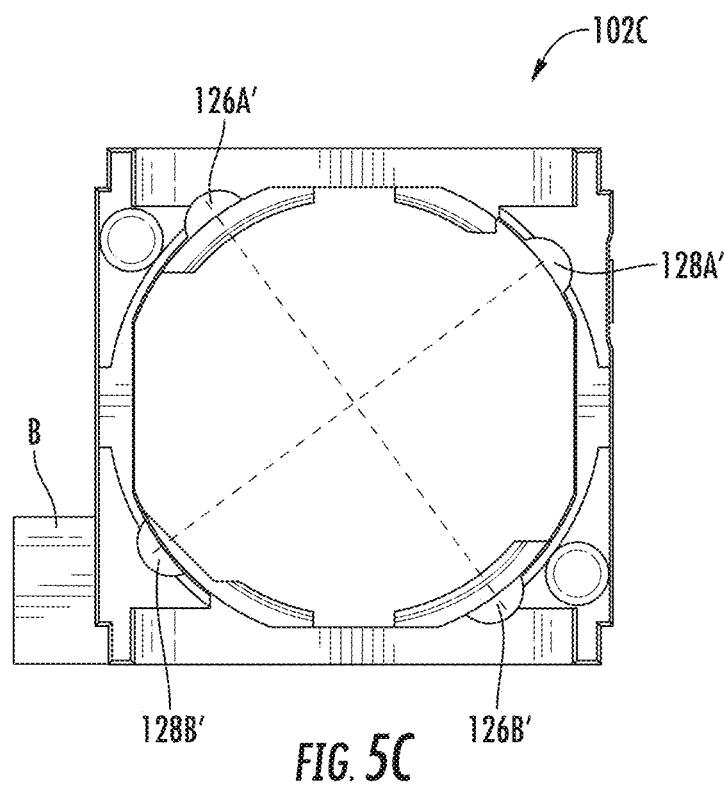
Figure 6:
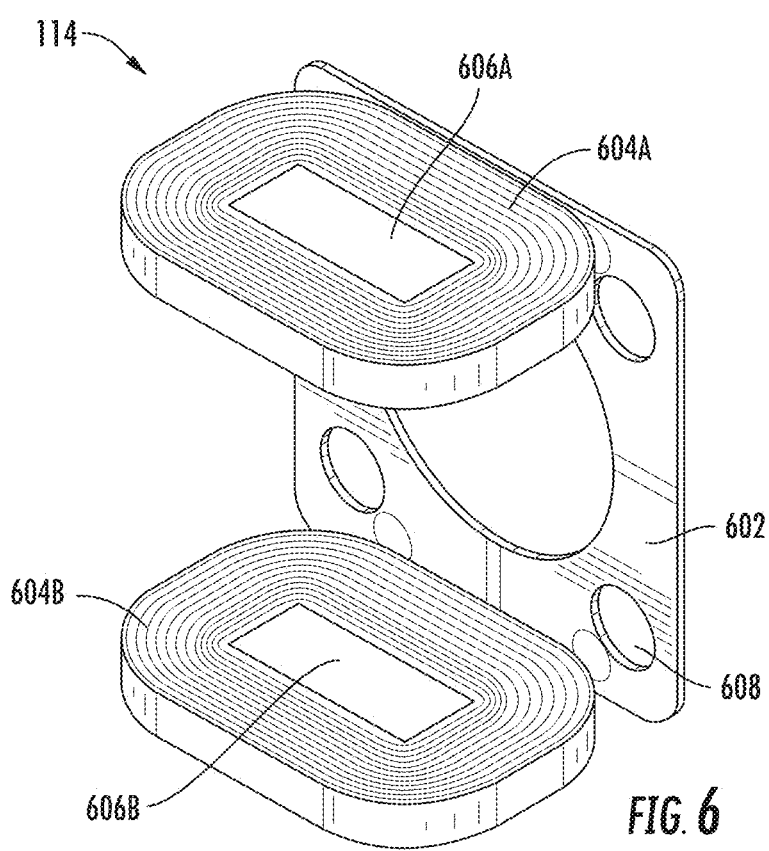
Figure 7A:
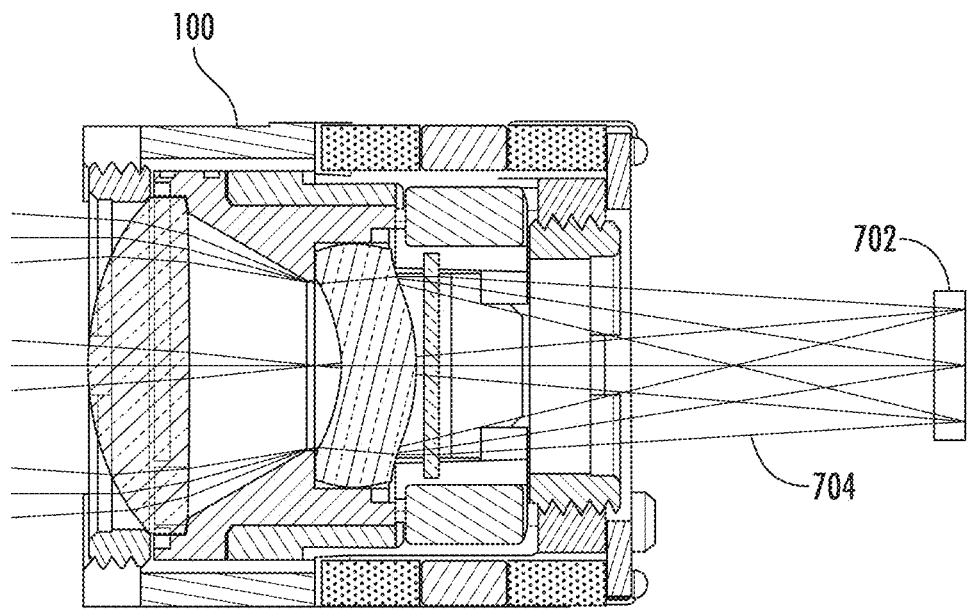
Figure 7B:
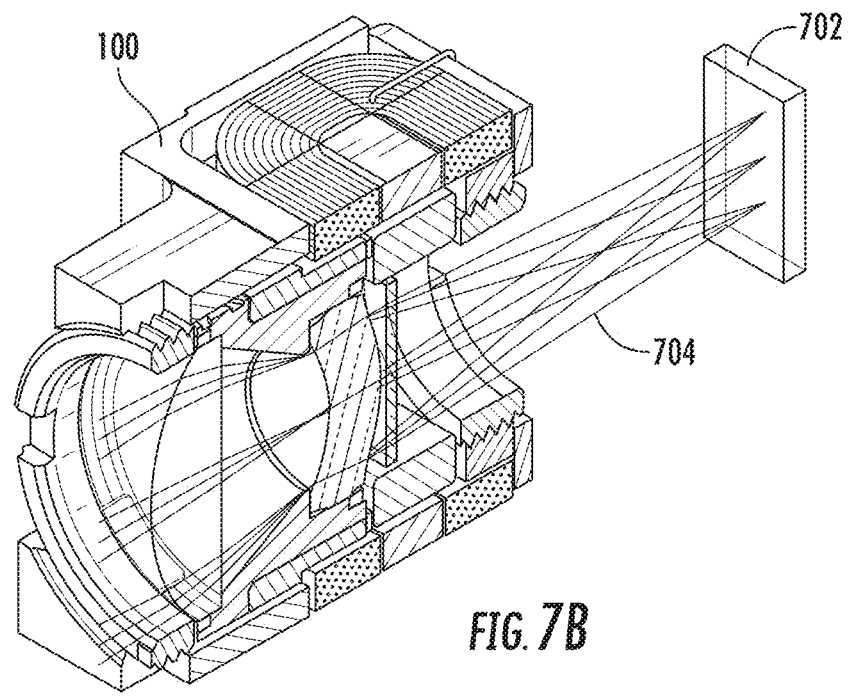
Figure 8A:
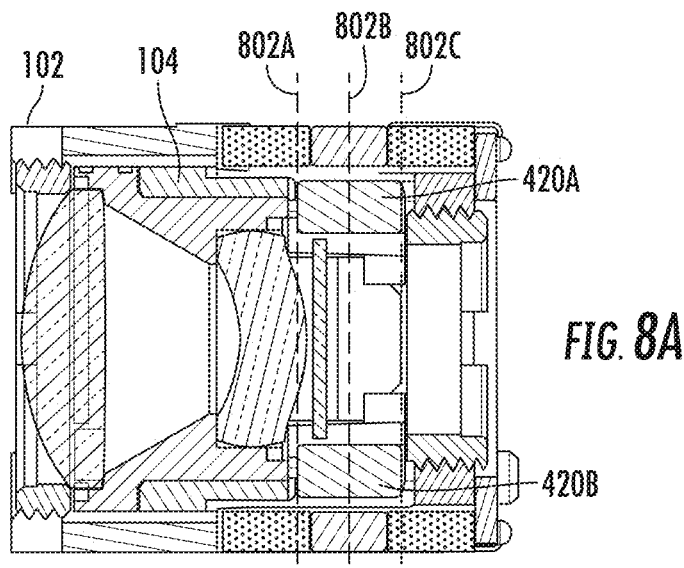
Figure 8B:
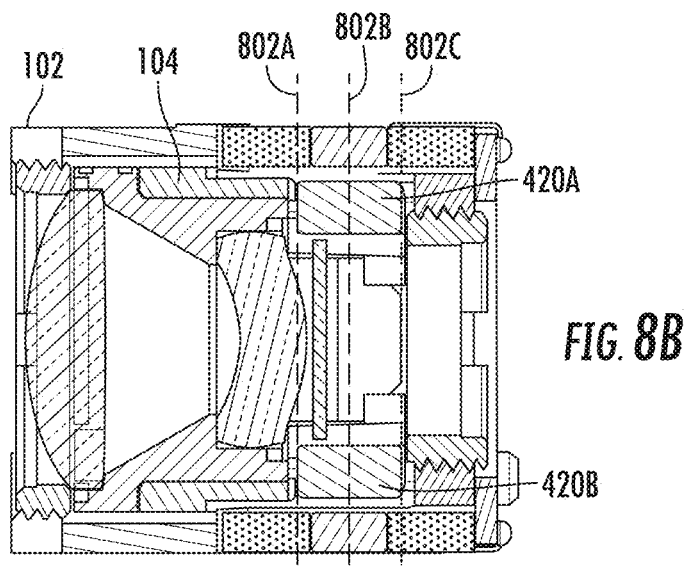
Figure 8C:
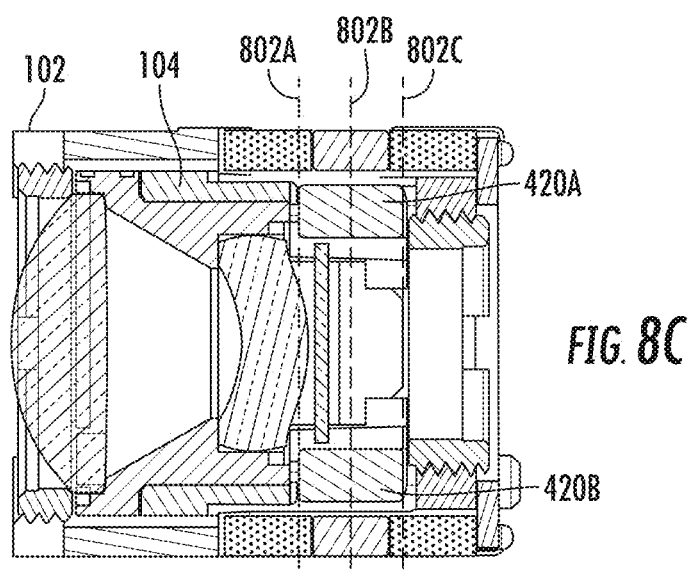
Figure 9A:
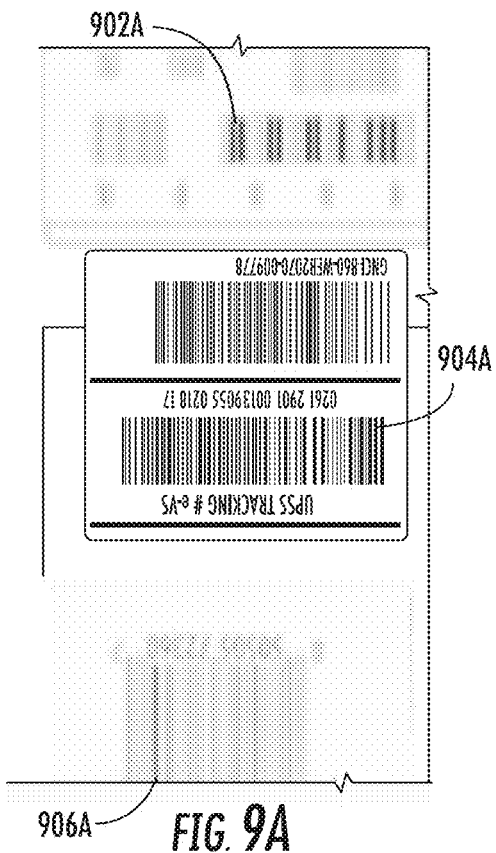
Figure 9B:
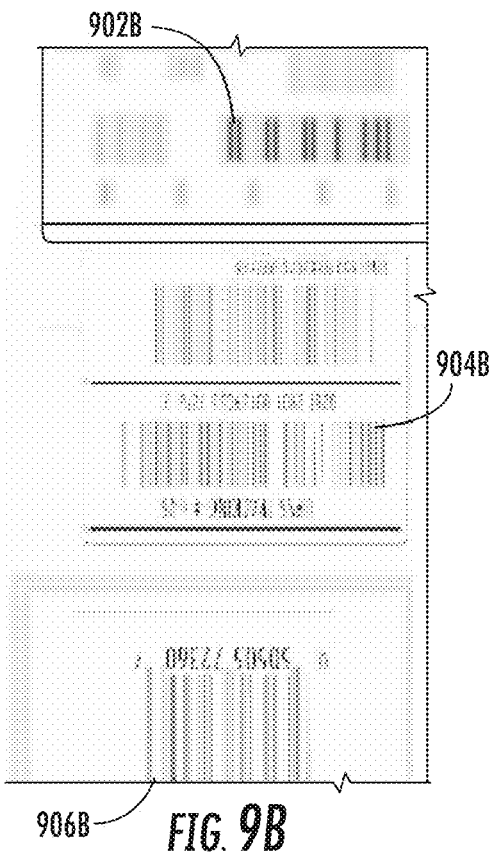
Figure 9C:
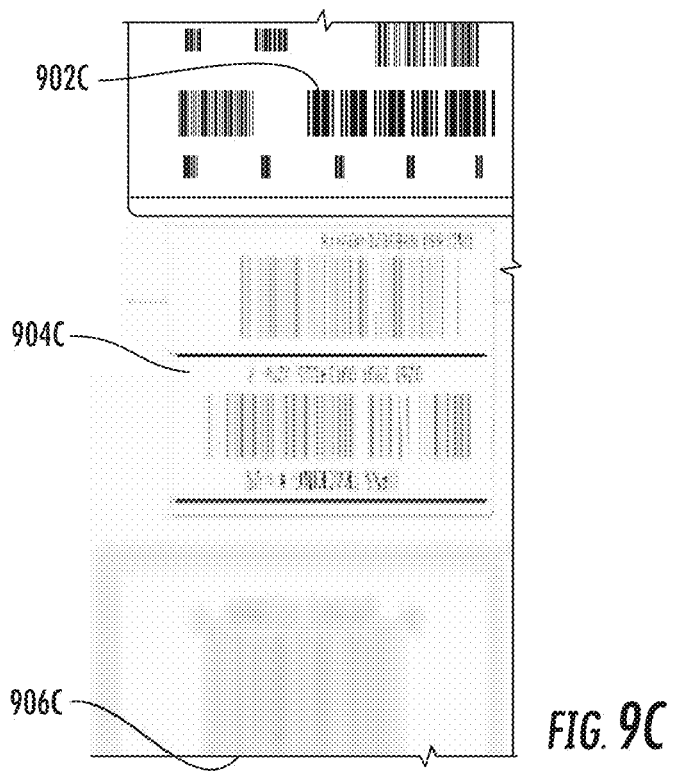
Figure 10A:
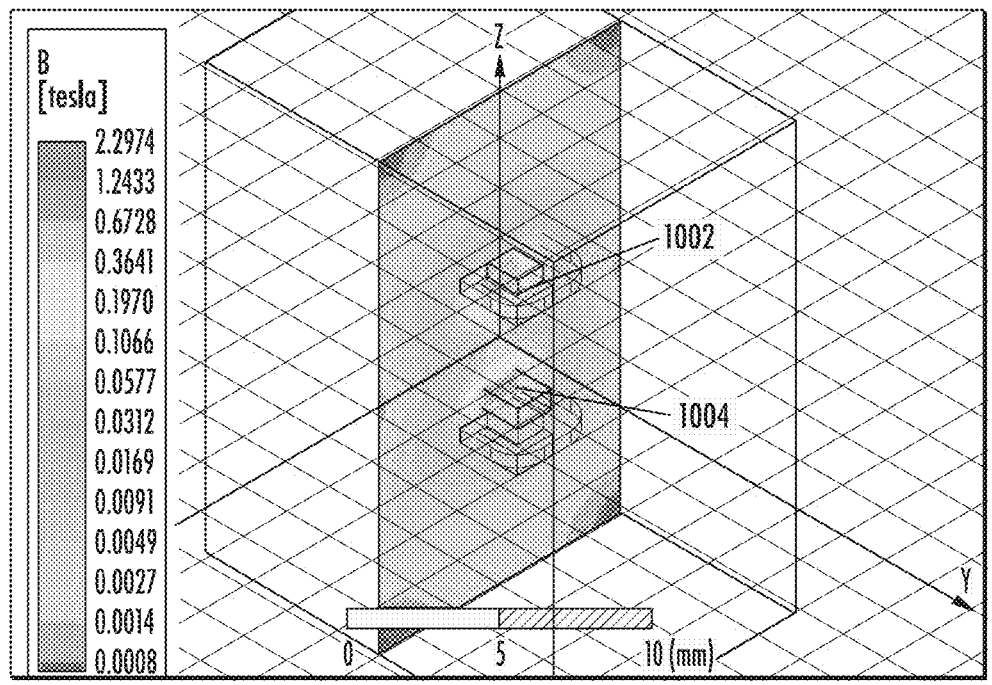
Figure 10B:
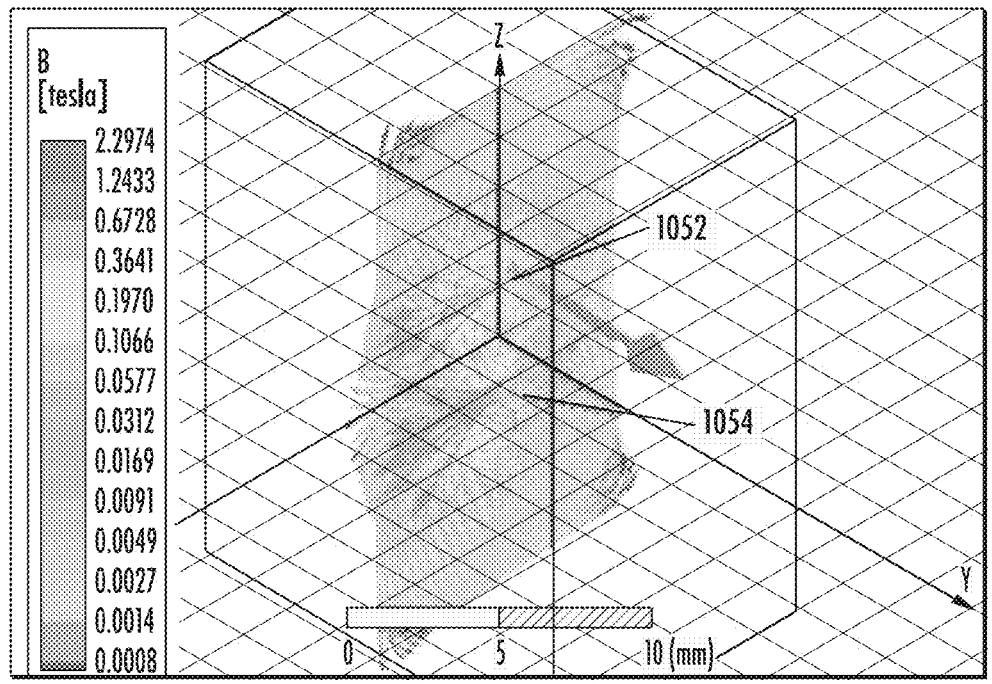
Figure 11:
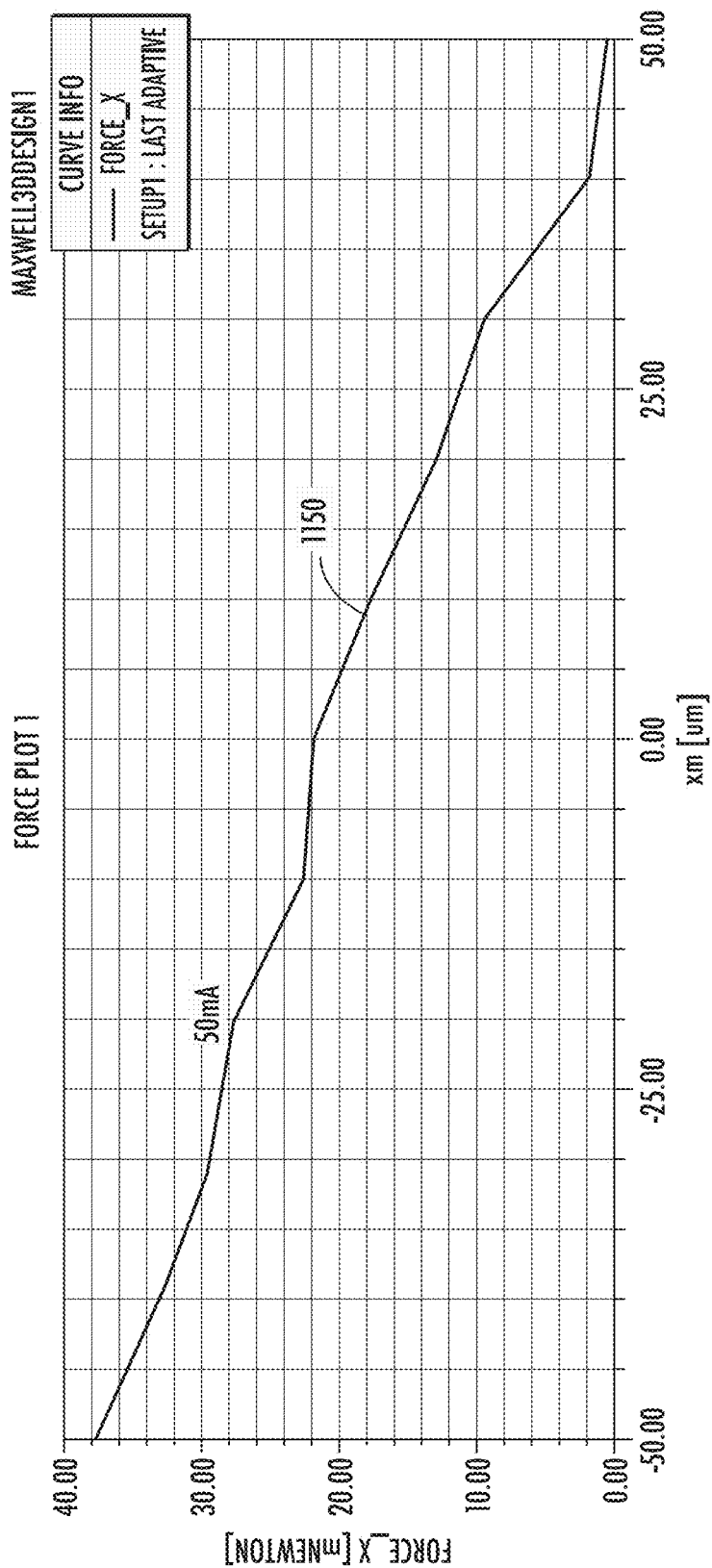
Figure 12:
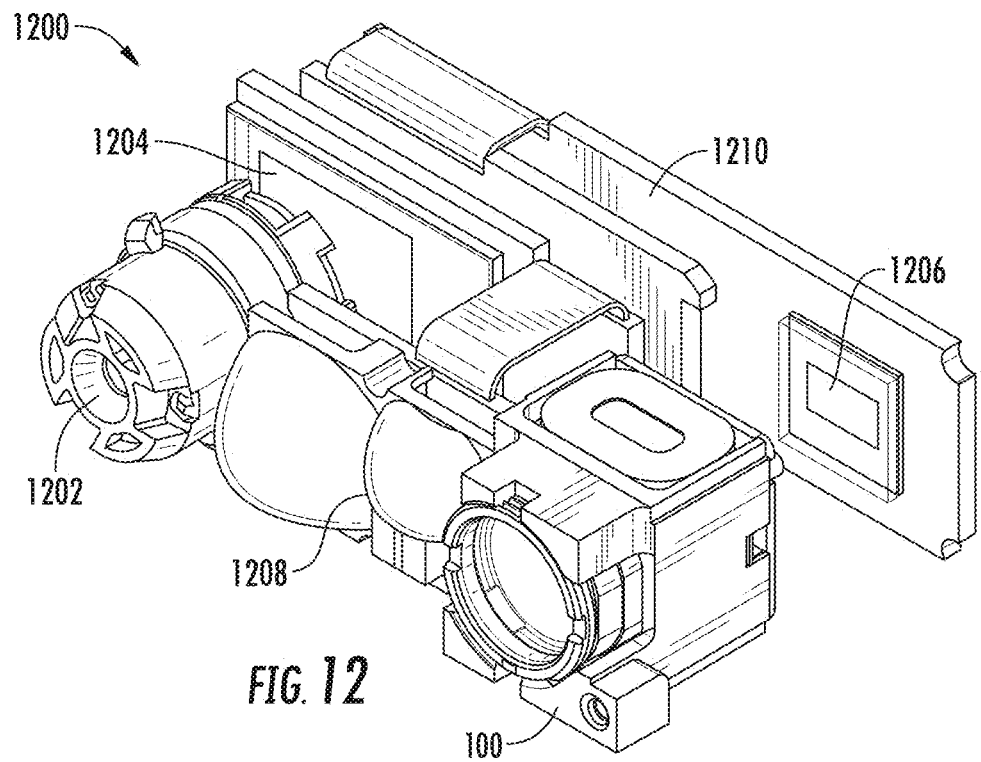
Figure 13:
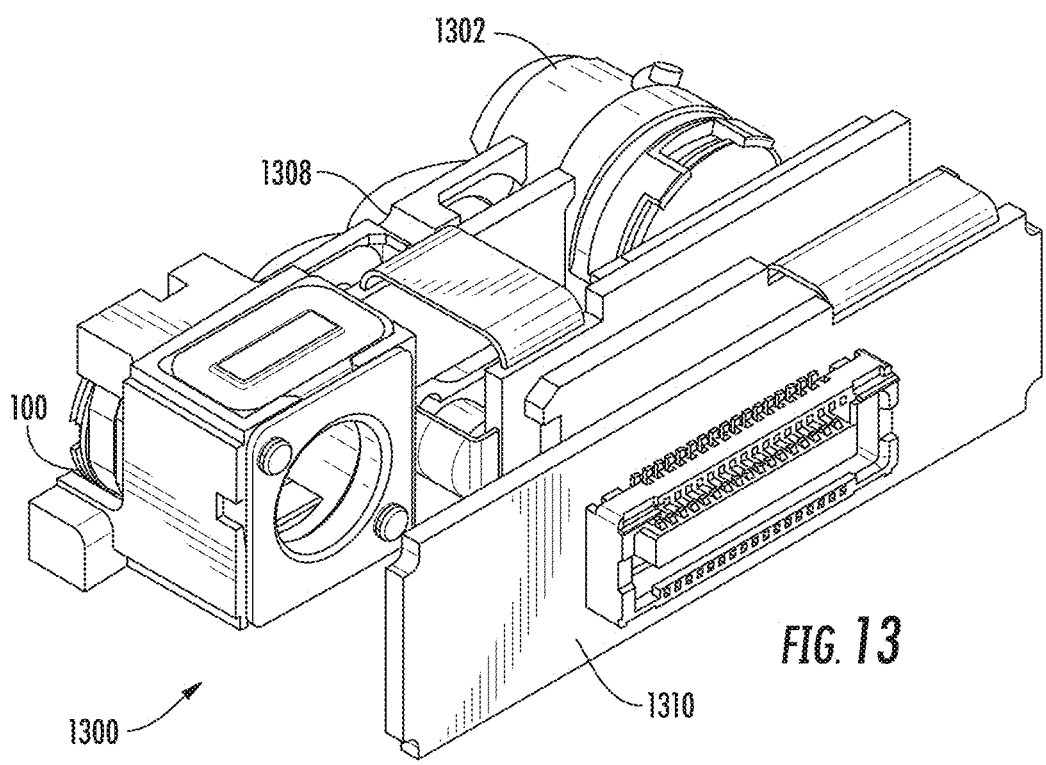
Figure 14A:
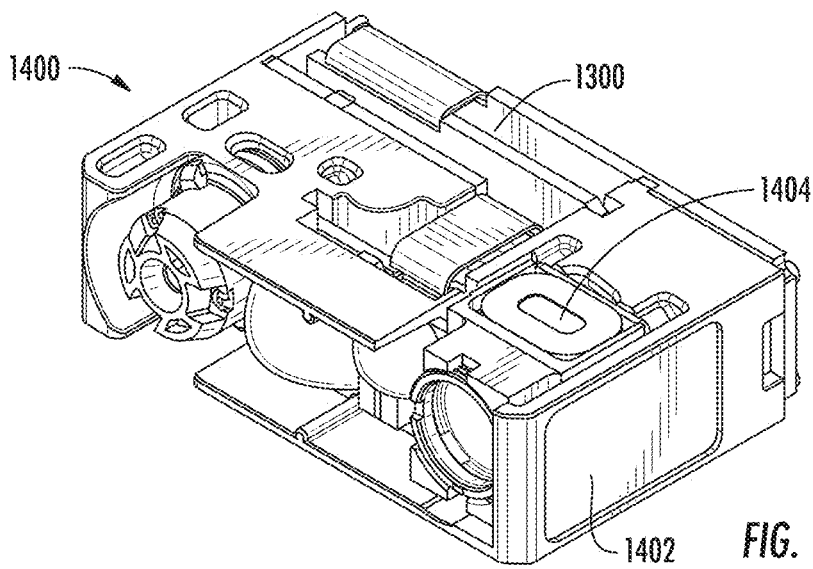
Figure 14B:
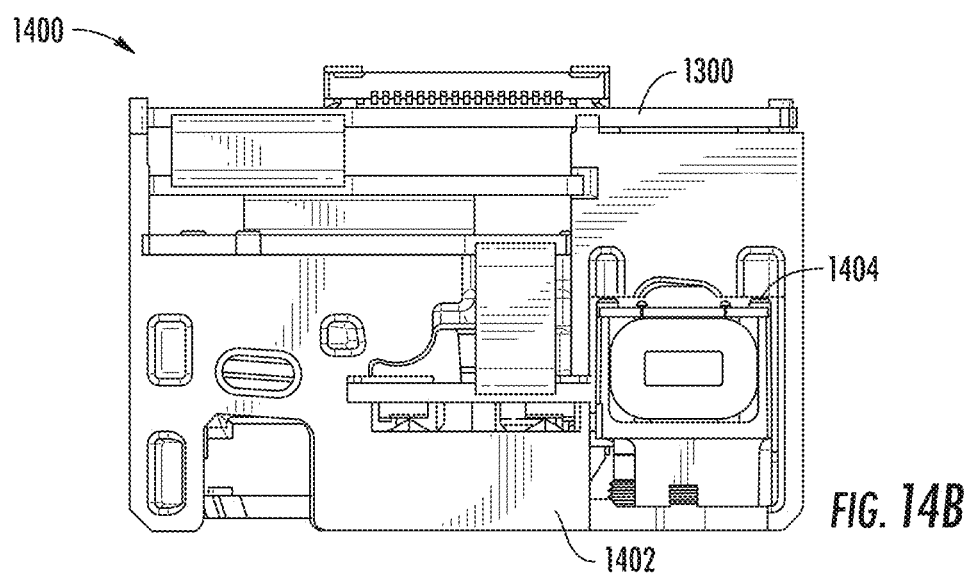
Figure 14C:
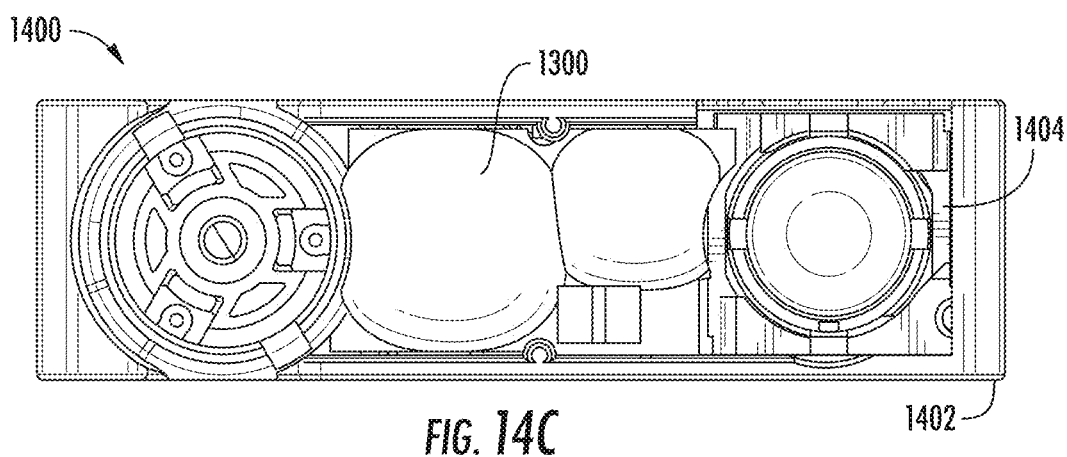
Figure 15:
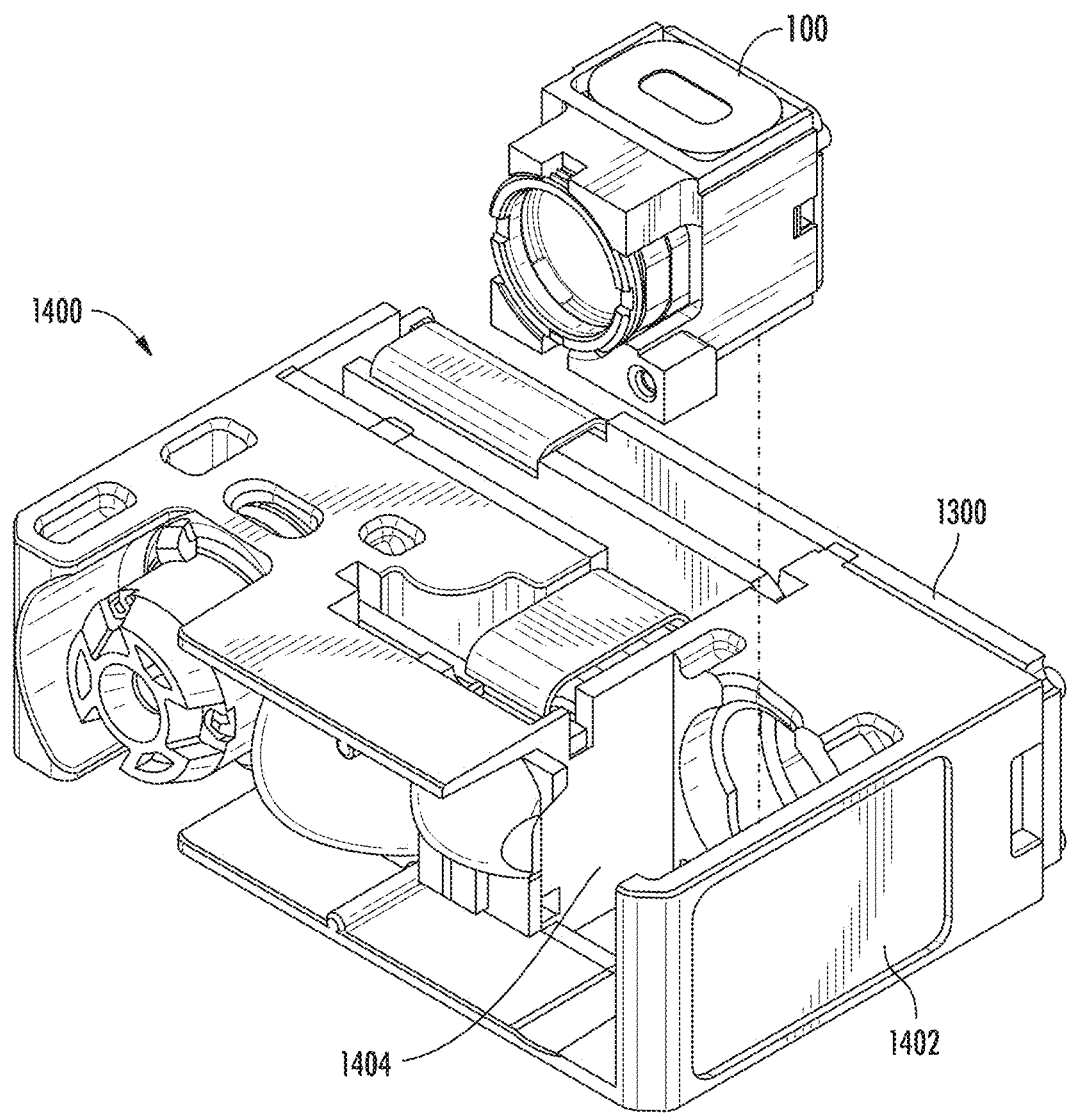
Figure 16:
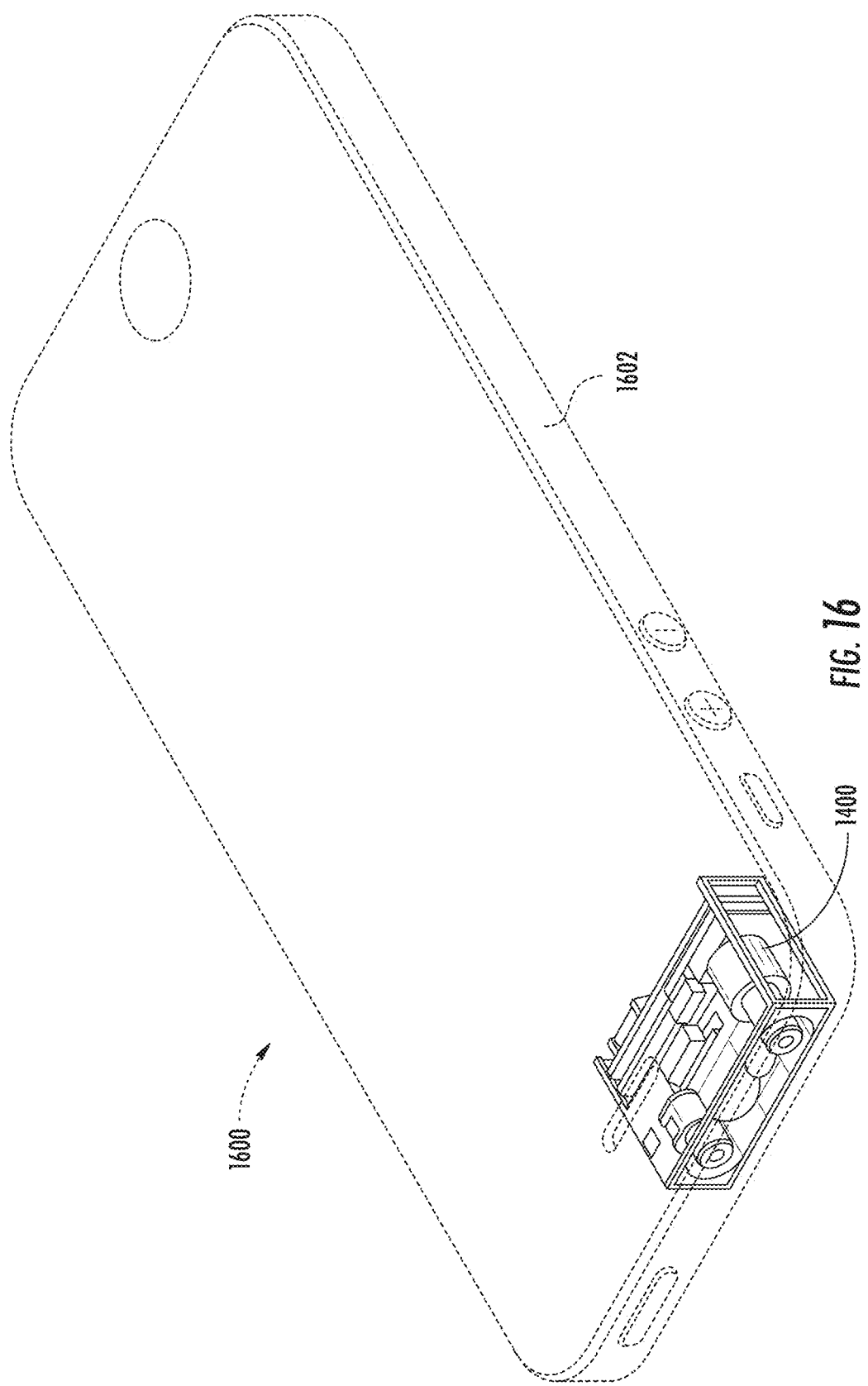
Figure 17:
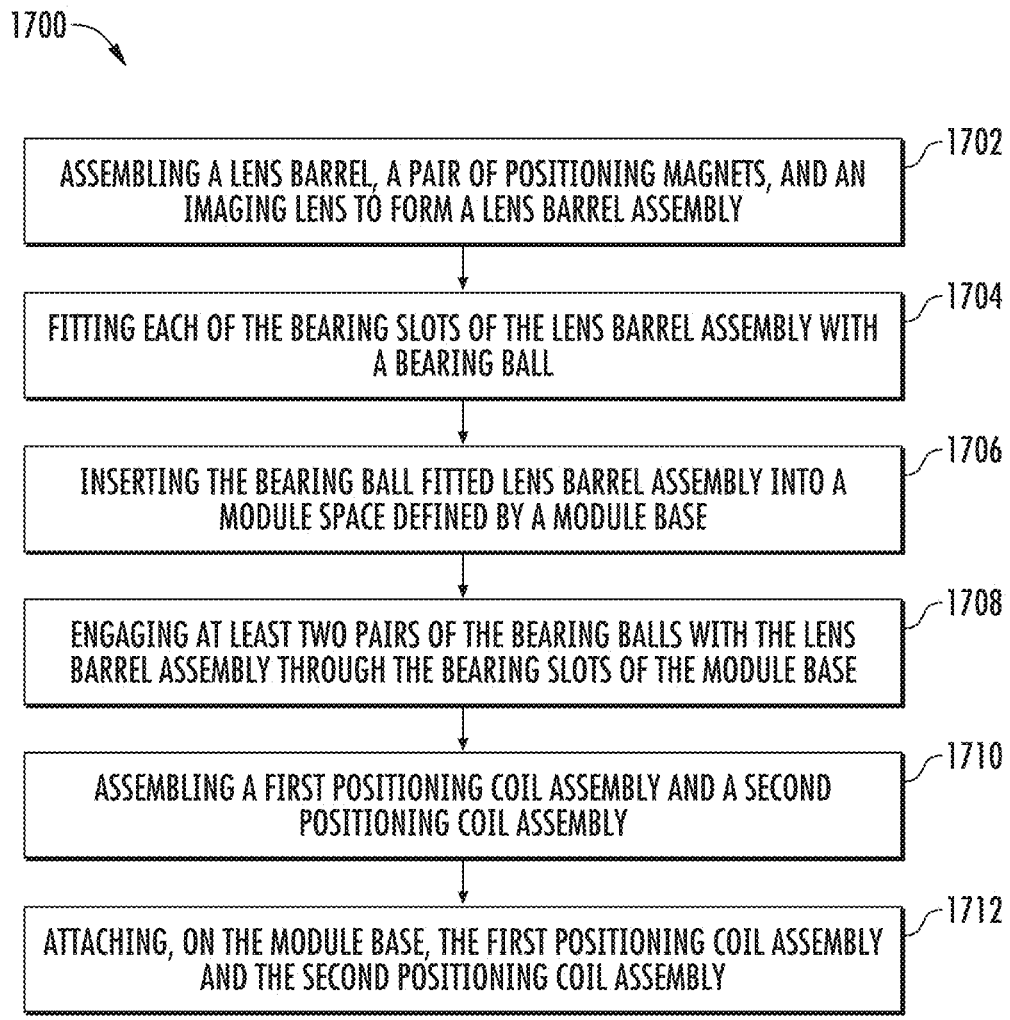
Figure 18:
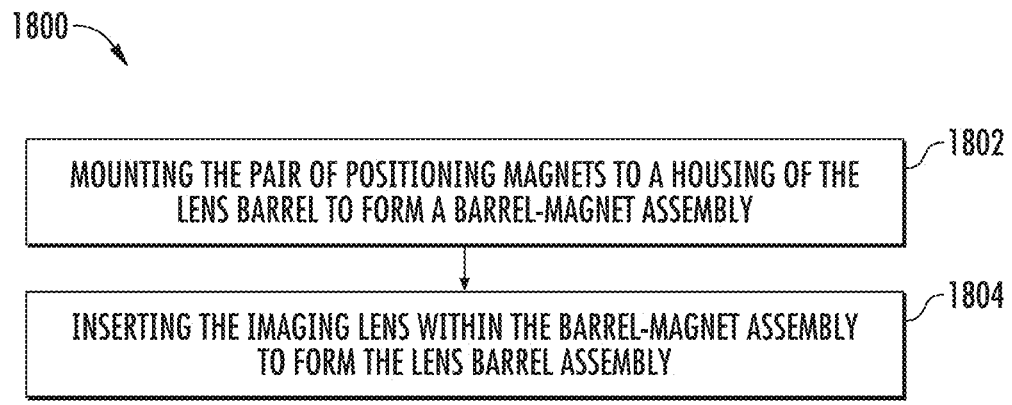
Figure 19:
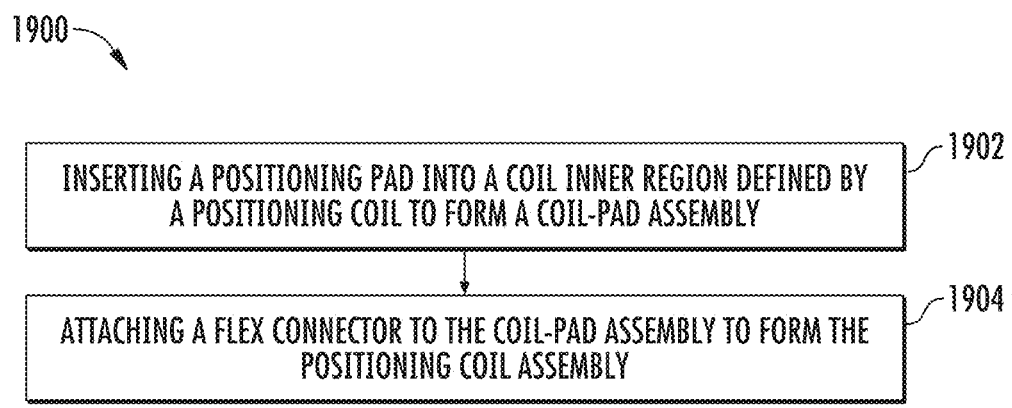

Having thus described the embodiments of the disclosure in general terms, reference now will be made to the accompanying drawings, which are not necessarily drawn to scale, and wherein:

FIG. 1A illustrates a block diagram of an example multi-sensor imaging system, in accordance with an example embodiment of the present disclosure;

FIG. 1B illustrates an example optical lens assembly in accordance with at least one example embodiments of the present disclosure;

FIGS. 2A-2D illustrate various views of an example variable focus lens assembly as assembled, in accordance with at least some example embodiments of the present disclosure;

FIGS. 3A-3C illustrate various cross-sectional views of interior of an example variable focus lens assembly, in accordance with at least one example embodiments of the present disclosure;

FIGS. 4A and 4B illustrate design details of an example optical member embodied as a lens barrel assembly, in accordance with at least one example embodiments of the present disclosure;

FIGS. 5A-5C illustrate perspective views of a module base of an example variable focus lens assembly in accordance with at least one example embodiment of the present disclosure;

FIG. 6 illustrates various design detailed of an example positioning coil board, in accordance with at least one example embodiment of the present disclosure;

FIGS. 7A and 7B illustrate an example visualization of light traversal through an example variable focus lens assembly for capture by an associated image sensor, in accordance with at least one example embodiment of the present disclosure;

FIGS. 8A, 8B, and 8C each illustrate example visualizations of a lens barrel assembly positioned at different focus positions, in accordance with at least one example embodiment of the present disclosure;

FIGS. 9A, 9B, and 9C each illustrate a visualization of an image data object including representations of various visual encoded indicia captured by an image sensor using a variable focus lens assembly having a lens barrel assembly positioned at different focus positions, in accordance with at least one example embodiment of the present disclosure;

FIG. 10A illustrates magnetic forces exerted by each of a pair of coil positioning assemblies associated with a pair of positioning magnets of a variable focus lens assembly in a circumstance where the pair of coil positioning assemblies are in a non-powered state, in accordance with at least one example embodiment of the present disclosure;

FIG. 10B illustrates magnetic forces exerted by each of a pair of coil positioning assemblies associated with a pair of positioning magnets of a variable focus lens assembly in a circumstance where the pair of coil positioning assemblies are in a first powered state, in accordance with at least one example embodiment of the present disclosure;

FIG. 11 illustrates an example distribution of the force in relation to displacement of a lens barrel assembly from a neutral focus position, in accordance with at least one example embodiment of the present disclosure;

FIG. 12 illustrates a perspective view of an example variable focus multi-sensor imaging engine including a variable focus lens assembly, in accordance with at least one example embodiment of the present disclosure;

FIG. 13 illustrates another perspective view of an example variable focus multi-sensor imaging engine including a variable focus lens assembly, in accordance with at least one example embodiment of the present disclosure;

FIGS. 14A, 14B, and 14C illustrate various views of an example variable focus multi-sensor imaging apparatus, in accordance with at least some example embodiments of the present disclosure;

FIG. 15 illustrates an example imaging apparatus including an apparatus chassis modified to enable housing of an example variable focus lens assembly, in accordance with at least some example embodiments of the present disclosure;

FIG. 16 illustrates a perspective view of an example mobile variable focus multi-sensor imaging apparatus including at least one variable focus lens assembly, in accordance with at least one example embodiment of the present disclosure;

FIG. 17 illustrates a flowchart depicting example operations of an example process for assembling a variable focus lens assembly, in accordance with at least one example embodiment of the present disclosure;

FIG. 18 illustrates a flowchart depicting example operations of an example process for assembling a lens barrel, a pair of positioning magnets, and an imaging lens to form a lens barrel assembly, in accordance with at least some example embodiments of the present disclosure; and FIG. 19 illustrates a flowchart depicting example operations of an example process 1900 for assembling a positioning coil assembly, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Imaging apparatuses are configured to enable execution of one or more image capture and processing tasks. For example, in at least some example contexts, an image apparatus is configured to enable reading of symbols, such as one or more barcodes, QR codes, data matrices, and/or the like. Often, such imaging apparatuses include one or more imagers for capturing image data object(s) representing a particular field of view defined by the imager. For example, an imager may include one or more image capture optics, such as one or more lens assemblies, coupled with an image sensor configured to capture light that traverses through the image capture optics to interact with the image sensor. In this regard, the lens assembly may define a particular field of view to be captured by the associated image sensor, and/or may define a particular focus range such that the image sensor captures an image data object that is clear and/or otherwise optimal for processing at and/or around the focus range. Such imagers may be associated with an illuminator of and/or associated with the imaging apparatus, for example including an illumination projection lens and associated illumination source, that provides light that illuminates the field of view to be captured.

Variable focus lens assemblies enable adjustment of the focus range to one or more different focus ranges. By adjusting the focus range, the effective range at which the lens assembly may be used to capture image data objects that are clear and/or well-defined enough to be successfully processed for a particular image processing task may be improved. For example, a variable focus lens adjustable between a first focus range and a second focus range may be used to capture image data objects sufficient for processing without repositioning an object to be scanned and/or the imaging apparatus itself. To provide the ability to alter the focus, conventional implementations for variable focusing remain bulky, slow, and/or vulnerable to one or more environmental impacts. In this regard, conventional variable focus lenses are often not suitable for use in small form factor and mobile imaging apparatuses, and/or physically cannot fit within such apparatuses for use.

In the context of mobile imaging apparatuses, for example, the imaging apparatus and each component thereof must remain functional, perform quickly, and be of a sufficiently small form factor for use in a mobile context. For example, in the context where an imaging apparatus is to be integrated within a cell phone or other limited form factor device, the imaging apparatus is restricted based on the limited dimensions of the cell phone mobile apparatus chassis (often approximately 7 millimeters). Similarly in this regard, to operate in such a context, the components of the imaging apparatus are each restricted by the even smaller form factor of the imaging apparatus.

Conventional variable focus lens implementations have limitations unsuitable for use in small form factor devices. For example, conventional voice coil motor focusing is highly sensitive to vibration and impact, such that use in a mobile imaging apparatus context where such vibrations and impact due to user operation and/or transport are likely. Additionally, for example, liquid lens focusing is limited by a large component size unsuitable for use in such small factor mobile imaging apparatus contexts. Additionally, for example, linear piezo motor focusing suffers slow response rate unsuitable for use in such small form factor mobile imaging apparatus. In this regard, in the mobile imaging apparatus context, each conventional implementation for variable lens focusing functions unreliably, cannot be compacted into a sufficiently small form factor, and/or suffers a slow response rate.

Even in other imaging apparatuses, there is a requirement to move the optical components configured for focusing in a seamless and quick manner without incurring much energy consumption. For example, imaging apparatuses used for indicia reading are often battery powered. The available on-board power is scarce and needs to be judiciously utilized to support operations of the device for a longer period of time. As such, each and every power consumption in such battery powered devices should be optimized to enhance battery life and reduce requirements for frequent charging. With regards to focusing assemblies, it is desired that the power spent in moving focal components is as less as possible. However, conventional mobility mechanisms utilize rollers and similar bearings to support mobility of optical components such as lenses. However, such mobility mechanisms are marred by inherent friction that increases with time and usage. This results in poor response of the quick focus arrangement for the lenses, often leaving objects to be imaged out of focus. Thus, the usability of such devices is limited, and they require frequent maintenance and upgrades.

Embodiments herein provide variable focus lens assemblies. Embodiments include variable focus lens assemblies including a lens barrel assembly positioned based on interactions between one or more positioning magnets and one or more positioning pads. In some such embodiments, each of a pair of positioning magnets is associated with one of a pair of positioning pads. The positioning pads are each associated with a positioning coil configured to receive an electrical charge that powers the positioning coil. The powered positioning coil is configured to generate a magnet force exerted to reposition the lens barrel assembly to a new focus position. In this regard, the lens barrel assembly is positioned based on the powered state of each of the positioning coils. Such implementations quickly reposition the lens barrel assembly such that the variable focus lens assembly is rapidly refocused (e.g., within a desired threshold), are less susceptible to vibrations, and may be implemented of a sufficiently small form factor for use in a mobile context. As such, embodiments of the imaging apparatuses may utilize one or more variable focus lens assemblies, for example as one or more lens assemblies in a multi-sensor environment.

Such exemplar variable focus lens assemblies provide a sufficient reliability, compact size, low power consumption, and high-speed response sufficient for use in small form factor imaging apparatuses. In this regard, such variable focus lens assemblies may be implemented in one or more imaging apparatuses to improve the effective range over which the imaging apparatus may capture image data objects for successful processing. It should be appreciated that, although several embodiments are described with respect to mobile imaging apparatus, such embodiments may be similarly implemented in one or more non-mobile imaging apparatuses. In some such embodiments, the embodiments may not be limited by a small form factor, but may use a similar structure as described herein.

Definitions

The term "imaging apparatus" refers to one or more hardware and/or software components configured to capture an image data object for processing. In some embodiments, an imaging apparatus includes at least one illuminator source and/or corresponding optics configured to provide an illumination onto a field for capture. A non-limiting example of an imaging apparatus is a "multi-sensor imaging apparatus," which refers to an imaging apparatus including a plurality of image sensors each configured to enable capture of an image data object, and The term "powering" refers to providing a current to an electrical circuit, component, and/or electrical conductor.

The term "positioning coil" refers to an electrical conductor wound into a coil shape and configured to generate a magnetic field upon powering the positioning coil. The positioning coil defines a "coil inner region," which refers to the open region between the positioning coil defined by the wound positioning coil.

The term "positioning coil assembly" refers to a positioning coil connected to at least a flex component to connect the positioning coil to a module base and/or coil powering circuitry.

The term "coil powering circuitry" refers to hardware configured to provide current to one or more positioning coil assemblies. In some example contexts, coil powering circuitry includes at least one power source connected to one or a plurality of positioning coil assemblies.

The term "powered state" refers to a value of current powering each of a pair of positioning coil assemblies. In an example context, a powered state represents the value of the sign of the current powering each of a pair of positioning coil assemblies. The term "non-powered state" refers to a value of no current powering each of a pair of positioning coil assemblies.

The term "imager" or "imaging module" refers to one or more components configured for capturing an image representing a particular field of view. In at least one example context, an imager includes at least one optical component (e.g., lens(es) and/or associated housing(s)) defining a particular field of view. Additionally or alternatively, in at least one example context, an imager includes an image sensor configured to output an image based on light that engages with the image sensor, such as via the optical components.

The term "image sensor" refers to one or more components configured to generate an image represented by a data object based on light incident on the image sensor. In some such example contexts, an image sensor converts light waves that interact with the image sensor into signals representing an image output by the sensor.

The term "imaging optical lens" refers to one or more lenses and/or supporting optical components defining an aperture that enables light to be received by an image sensor associated with the imaging optical lens. In some embodiments, an imaging optical lens is formed entirely of glass, entirely of plastic, an optical liquid material, and/or of any combination thereof.

The term "lens barrel assembly" refers to a component associated with a corresponding image sensor, the component including at least an imaging optical lens and a lens housing. In some embodiments, as escribed herein, the lens barrel assembly includes one or more defined areas to support a positioning magnet.

The term "positioning magnet" refers to a magnet included in a lens barrel assembly to enable shifting of a focus position for the lens barrel assembly. In some embodiments, a lens barrel assembly includes a pair of positioning magnets designed to interact with one or more associated components, such as a pair of positioning coil assemblies and/or positioning pads, to change the focus position of the barrel lens assembly as described herein. Non-limiting examples of a positioning magnet includes a plated neodymium magnet, including without limitation a zinc-plated magnet, a nickel-plated magnet, and/or other protective coating.

The term "positioning pad" refers to magnetic material designed to fit within the coil inner region of a positioning coil. In one example context, a positioning pad is shaped as a cuboid. A positioning coil assembly is positioned adjacent to a positioning magnet that is associated with the positioning pad. In this regard, in some contexts, a pair of symmetrical positioning pads are positioned opposite one another, each associated with one of a pair of positioning coil assemblies, the pair of positioning coil assemblies positioned opposite one another, such that when the positioning coil assemblies are in an non-powered state, the positioning pad is aligned with the positioning magnet. The term "iron positioning pad" refers to a positioning pad specifically formed of iron, including an iron coating, and/or formed of majority iron.

The term "module base" refers to a housing configured to enable positioning and/or alignment of one or more components of a variable focus lens assembly. Additionally or alternatively, in some embodiments, a module base enables connection of one or more of the components with corresponding powering circuitry and/or processing circuitry.

The term "coil position" refers to a position of a positioning coil with respect to an associated lens barrel assembly. In some embodiments, for example, a first positioning coil is positioned at a first coil position located on top of an associated lens barrel assembly, and a second positioning coil is positioned at a second coil location located on the bottom of an associated lens barrel assembly, such that the first coil position is opposite the second coil position.

The term "positioning area," with respect to a positioning coil assembly, refers to defined portion of a module base designed to support a positioning coil assembly, including a positioning pad within the coil inner region. In some embodiments, a module base includes a first coil position and a second coil position to support a pair of positioning coil assemblies, the first coil position opposite the second coil position such that the pair of coil assemblies generates a magnetic force to move the lens barrel assembly along a longitudinal axis.

The tem "inner module space" refers to a void of space defined by the inner walls and/or other supporting structures of the module base. In some embodiments, the inner module space is defined sufficiently to fit a lens barrel assembly and/or corresponding positioning and/or alignment components.

The term "bearing slot" refers to a space in a component, defined by an outer boundary, designed to receive and/or movably secure a ball bearing. In at least one example context, bearing slot opening defines a spherical, tubular, or cylindrical space configured to receive a ball bearing.

The term "ball bearing" refers to a metallic, semi-metallic, or non-metallic solid ball and/or other circular roller designed to engage a bearing slot opening of a component. In at least one example context, the ball bearing is designed to engage the bearing slot opening through sliding into the bearing slot opening.

The term "focus position" refers to a position of a lens barrel assembly within the inner module space of a module base. In this regard, in an example context, the focus positioning of a lens barrel assembly represents a shift from a default position, and/or an absolute position, along a longitudinal axis. In an example context, the focus position of lens barrel assembly is changed based on a value of power applied to one or more positioning coil assemblies.

The term "front positional limit" refers to a focus position closest to the inner wall of the front of a module base. In some embodiments, the front positional limit is defined by the inner wall of the front of the module base itself. In other embodiments, the front positional limit is defined by one or more front limit components.

The term "back positional limit" refers to a focus position closest to the inner wall of the back of a module base. In some embodiments, the back positional limit is defined by the inner wall of the back of the module base itself. In other embodiments, the back positional limit is defined by one or more back limit components.

The term "focus range" refers to an optimal distance between a lens barrel assembly and/or imaging apparatus and a field for the field to be in focus. In at least one example context, as the focus position of a lens barrel assembly changes, so does the focus range. The term "default focus range" refers to a particular focus range predetermined to be the most likely distance between the lens barrel assembly and/or imaging apparatus and a field for an intended use, such as for detecting, capturing, and/or decoding two-dimensional symbologies and/or three-dimensional symbologies.

The term "default focus position" refers to a focus position of a lens barrel assembly when each of a pair of positioning coil assemblies is in a non-powered state. In an example context, the default focus position aligns each positioning magnet of the lens barrel assembly with an associated positioning pad.

The term "predetermined focus position" refers to a discrete value of a focus position from a possible set of focus positions. For example, in at least one example context, a variable focus lens assembly is designed based on a 3-state set of focus positions: a first focus position for a first powered state (e.g., positive current), a second focus position for a second powered state (e.g., negative current), and a third focus position for a non-powered state (e.g., no current).

The term "continuous focus position" refers to a value of a focus position from a continuous range of focus positions defined by a maximum focus position and a minimum focus position. In at least one example context, a continuous focus position reflects a value based on the value of power provided to the pair of positioning coil assemblies.

The term "near focus position" refers to a value of a focus position to focus the lens barrel assembly for a predetermined focus range under a predetermined threshold. The term "far focus position" refers to a value for a focus position to focus the lens barrel assembly for a second predetermined focus range above a predetermined threshold. The term "neutral focus position" refers to a value for a focus position to focus the lens barrel assembly for a third predetermined focus range at a predetermined threshold.

The term "non-glossy dark surface" refers to a surface that reflects below a predetermined threshold percentage of received light in a specular direction. In some embodiments, to minimize specular light, the non-glossy dark surface is of a sufficiently dark color.

The term "magnet surface epoxy" refers to a coating of a positioning magnet to provide a non-glossy dark surface along at least one surface of the positioning magnet.

The term "lens mount" refers to one or more structural components and/or hardware securing the position and/or alignment of a variable focus lens within an imaging apparatus. In some embodiments, an apparatus chassis of an imaging apparatus comprises a defined space that engages the variable focus lens, such that the outer wall of the defined space comprises the lens mount.

The term "visual encoded indicia" refers to a rendered, printed, and/or otherwise visible representation of one or more symbologies configured for scanning by an imaging apparatus. Non-limiting examples of a visual encoded indicia include a 2D barcode, UPC, Quick Response Code, Data Matrix, and custom encoded image.

FIG. 1A illustrates a block diagram of an example multi-sensor imaging system 10 (hereinafter, also referred to as imaging system 10), in accordance with an example embodiment of the present disclosure. The multi-sensor imaging system 10 includes an imaging engine 100 communicatively coupled with a controller 20, a communication interface 40, an activation component 60, and one or more peripheral components 80. In some example embodiments, the imaging system 10 may include fewer or more components than shown in FIG. 1A. The imaging system 10 is configured for capturing one or more images of a target in one or more fields of views using one or more illumination sources. The imaging system 10 processes the one or more images to execute one or more image processing tasks such as indicia reading. Accordingly, in some example embodiments of the disclosure, the imaging system 10 may be embodied in part or full as an indicia or symbol reader or a handheld device capable of reading indicia and similar symbols. Some example embodiments of the imaging system 10 are illustrated with reference to FIGS. 12-16, details of which will be described in the subsequent portions of the disclosure.

Controller 20 may be configured to carry out one or more control operations associated with the imaging system 10. For example, controller 20 may control the imaging engine 100 to cause image capture of a target in a field of view of the imaging engine 100. Additionally, the controller 20 may process the captured images to carry out one or more image processing tasks. The controller 20 may be embodied as a central processing unit (CPU) comprising one or more processors and a memory. In some example embodiments, the controller 20 may be realized using one or more microcontroller units (MCU), as one or more of various hardware processing means such as a coprocessor, a microprocessor, a digital signal processor (DSP), a processing element with or without an accompanying DSP, or various other processing circuitry including integrated circuits such as, for example, an ASIC (application specific integrated circuit), an FPGA (field programmable gate array), a hardware accelerator, a special-purpose computer chip, or the like. In some embodiments, the processor of the controller 20 may include one or more processing cores configured to operate independently. A multi-core processor may enable multiprocessing within a single physical package. Additionally, or alternatively, the processor may include one or more processors configured in tandem via the bus to enable independent execution of instructions, pipelining and/or multithreading.

The memory may be non-transitory and may include, for example, one or more volatile and/or non-volatile memories. For example, the memory may be an electronic storage device (for example, a computer readable storage medium) comprising gates configured to store data (for example, bits) that may be retrievable by a machine (for example, a computing device like the processor). The memory may be configured to store information, data, content, applications, instructions, or the like, for enabling the apparatus to carry out various functions in accordance with an example embodiment of the present invention. For example, the memory could be configured to buffer data for processing by the processor. Additionally, or alternatively, the memory could be configured to store instructions for execution by the processor.

The processor (and/or co-processors or any other processing circuitry assisting or otherwise associated with the processor) may be in communication with the memory via a bus for passing information among components of the imaging system 10. The processor may be configured to execute instructions stored in the memory or otherwise accessible to the processor. Additionally, or alternatively, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. The processor may include, among other things, a clock, an arithmetic logic unit (ALU) and logic gates configured to support operation of the controller 20.

The communication interface 40 may comprise input interface and output interface for supporting communications to and from the imaging system 10. The communication interface 40 may be tiny means such as a device or circuitry embodied in either hardware or a combination of hardware and software that is configured to receive and/or transmit data to/from a communications device in communication with the imaging system 10. In this regard, the communication interface 40 may include, for example, an antenna (or multiple antennae) and supporting hardware and/or software for enabling communications with a wireless communication network. Additionally or alternatively, the communication interface 40 may include the circuitry for interacting with the antenna(s) to cause transmission of signals via the antenna(s) or to handle receipt of signals received via the antenna(s). In some environments, the communication interface 40 may alternatively or additionally support wired communication. As such, for example, the communication interface 40 may include a communication modem and/or other hardware and/or software for supporting communication via cable, digital subscriber line (DSL), universal serial bus (USB; or other mechanisms.

The activation component 60 may include hardware, software, firmware, and/or a combination thereof, configured to indicate initiation (and/or termination) of desired functionality by the user. For example, the activation component 60 may transmit an activation signal to cause the controller 20 to begin operation of the imaging engine 100, for example to begin illumination by one or more illumination sources, adjust focus, and/or capture by image sensors, one or more images. Additionally or alternatively, the activation component 60 may transmit a deactivation signal to the controller 20 to terminate the corresponding functionality, for example to cease scanning via the image sensor(s). In some embodiments, the activation component 60 is embodied by one or more buttons, triggers, and/or other physical components provided in or on the body of a chassis. For example, in at least one example context, the activation component 60 is embodied by one or more "trigger" components that, when engaged by an operator (e.g., when an operator squeezes the trigger), transmits a signal to the controller 20 to initiate corresponding functionality. In some such embodiments, the activation component may transmit a deactivation signal to the controller 20 to cease such functionality when the component is disengaged by the operator (e.g., when the operator releases the trigger). Alternatively or additionally, in at least some embodiments, the activation component 60 is embodied without any components for direct engagement by an operator. For example, when the imaging system 10 is embodied as an imaging apparatus, the activation component 60 may be embodied by hardware and/or software, or a combination thereof, for detecting the imaging apparatus has been raised and/or positioned to a predefined "scanning" position, and/or lowered from that position to trigger deactivation. Alternatively or additionally, the activation component 60 may be embodied as a user interface element of the imaging system 10. In such embodiments, the activation component 60 embodied as a user interface element may be configured to receive an input from the user on a user interface and in turn transmit a corresponding command to the controller 20.

The one or more peripheral components 80 include other structural and functional elements of the imaging system 10 such as for example a display device, a user interface, a housing, a chassis, power source and the like. One or more of the peripheral components 80 may be controlled by the controller and may operate as per instructions or control provided by the controller 20.

In some example embodiments, the imagine engine 100 may be embodied as an optical assembly comprising one or more sub engines for image capture in a particular field of view. In this regard, in some example embodiments, the imaging engine may include a variable focus lens assembly as the primary engine for image capture in a far-field of view of the imaging system 10 and additionally or optionally include a near-field imaging engine as a secondary engine for image capture in the near field of view. The near field engine may be a conventional imager suitable for near field imaging. Throughout this disclosure, unless specified in particular context, the imagine engine and the variable focus lens assembly would mean the same and may be referred to using the same numeral.

FIG. 1B illustrates an exploded view of an example variable focus lens assembly, in accordance with at least some embodiments of the present disclosure. The variable focus lens assembly 100 comprises a module base 102, a lens barrel assembly 104, a pair of front bearing balls 108A, a pair of rear bearing balls 108B, a front stop 106, a holder cover 110, a rear stop 112, and a positioning coil board 114. The module base 102 is specially designed to define an inner module space. The inner module space is designed to fit the lens barrel assembly 104, such that the lens barrel assembly 104 may be positioned within the inner module space of the module base 102. The module base 102 may further includes apertures, at the front and back of the module base 102, to enable light to traverse through the apertures and lens elements of the lens barrel assembly 104.

The lens barrel assembly 104 includes a lens barrel housing one or more optical components, such as one or more image lenses and/or other lens elements, to define a particular field of view. In this regard, the lens barrel assembly 104 is designed including a front and back aperture to enable light to traverse through the lens barrel assembly 104 to one or more other components (for example, an image sensor as described herein). Additionally or alternatively, in some embodiments, the lens barrel assembly 104 includes one or more positioning magnets for use in positioning the lens barrel assembly 104, as described herein. For example, as illustrated, the lens barrel assembly 104 includes a top positioning magnet located on top of the lens barrel assembly 104 and a bottom positioning magnet located on the bottom of the lens barrel assembly 104. The lens barrel housing may comprise a plurality of bearing ball slots carved into it, each bearing ball slot having an associated bearing ball slot opening configured to receive a bearing ball. Each of the bearing ball slots may be configured to support rolling and gliding movement of a corresponding bearing ball in it such that the lens barrel is capable of gliding laterally along the optical axis of the assembly 100. In some example embodiments, one or more of the bearing ball slots on the lens barrel assembly 104 may be carved as a hollow half cylinder in shape as is shown in FIGS. 4A and 4B.

The positioning coil board 114 includes hardware and/or circuitry configured to receive an electrical charge. The electrical charge powers one or more positioning coils of at least one positioning coil assembly of the positioning coil board 114. In this regard, as illustrated for example, the positioning coil board 114 includes a top positioning coil assembly 116A and a bottom positioning coil assembly 116B, the top and bottom positioning coil assembly positioned opposite each other. In some such embodiments, the positioning coil board 114 is designed to receive an electrical current applied to power each positioning coil assembly thereof. As illustrated, the positioning coil board 114 is designed such that the top positioning coil assembly 116A of the positioning coil board 114 extends over at least a portion of the top space of the module base 102, for example to interact with a top positioning magnet of the lens barrel assembly 104. Similarly as illustrated, the positioning coil board 114 is designed such that the bottom positioning coil assembly 116B of the positioning coil board 114 extends over at least a portion of the bottom space of the module base 102.

The module base 102 may comprise a chassis specifically designed to house and support various components of the variable focus lens assembly 100. In this regard, in some example embodiments, the module base 102 may be of modular structure and be assembled as a jacket for the components to be housed within it. The module base 102 may comprise any suitable material that is capable of supporting the structural integrity while adding minimal weight and space constraints to the variable focus lens assembly 100. In some example embodiments, the module base 102 may be made of a suitable polymer or fiber with ingrained metallic support wherever necessary. The module base 102 may also comprise a plurality of bearing ball slots each having one slot opening configured to receive a bearing ball. In some example embodiments, one or more of the bearing ball slots on the module base 102 may be carved as a hollow half cylinder in shape as is shown in FIGS. 5A-5C. A detailed description of the structural and operational aspects of the module base 102 will be described with reference to FIGS. 5A-5C of this disclosure.

The variable focus lens assembly 100 may also comprise at least one pair of bearing balls. For example, in the example illustrated in FIG. 1B, the variable focus lens assembly 100 comprises a pair of front bearing balls 108A and a pair of rear bearing balls 108B. In some example embodiments, without limitation, it may be preferred that the variable focus lens assembly 100 comprise four bearing balls, each pair of bearing balls being crossed in positional arrangement with the other pair of bearing balls. Having such a configuration provides sufficient mobility support to a component such as the lens barrel assembly 104 engaged with the bearing balls while minimizing the frictional impacts. For example, a full ball bearing with balls between the bearing races on either side of the lens barrel assembly 104 may be marred by more friction than what would exist with four bearing balls. Also, two pairs of crossed bearing balls are sufficient to provide movable support to the lens barrel assembly 104 with minimum friction. As such, some example embodiments of the disclosure may be directed to a configuration having two pairs of crossed bearing balls as shown in FIG. 5C. Irrespective of the count of the balls, each of the bearing balls may be receivable by a corresponding full slot defined by one bearing ball slot of the lens barrel assembly 104 and a bearing ball slot of the module base 102. In such a configuration, the hollow half cylindrical shapes of each of the bearing ball slots of the lens barrel assembly 104 and the module base 102 may together define a recess in which the bearing ball is movably positioned such that the lens barrel assembly 104 is movable over the bearing ball.

The bearing balls and the bearing ball slots in the lens barrel assembly 104 and the module base 102 together position and align each of the lens barrel assembly 104 and the module base 102, for example as depicted with respect to FIGS. 2A-2D. In this regard, in some embodiments, the bearing balls 108A and 108B enable axial alignment of the lens barrel assembly 104 and one or more additional components, for example the module base 102. The lens barrel assembly 104 may be designed to transverse over the bearing balls 108a and 108B to reposition the lens barrel assembly 104 within the inner module space defined by the module base 102. For example, in this regard, the positioning coil board 114 may interact with the lens barrel assembly 104 such that a powered magnetic force is exerted on the lens barrel assembly 104. In at least one example context, the positioning coil assemblies 116A and 116B of the positioning coil board 114 are powered to cause a magnetic force to be exerted on the lens barrel assembly 104, which interacts with a default magnetic force between the lens barrel assembly 104 and the positioning coil board 114. The magnetic force causes the lens barrel assembly 104 to translate to a new focus position along the optical axis, such that the lens barrel assembly 104 is positioned differently within the inner module space defined by the module base 102. That is, the magnetic forces from the positioning coil board 114 provides a push or pull effect on the lens barrel assembly 104 which in turn causes the lens barrel assembly 104 to glide over the bearing balls 108A and 108B positioned in the respective bearing slots. Since the module base 102 is immovable with respect to the positioning coil board 114, the push or pull effect is demonstrated by the lens barrel assembly 104. The front of the module base 102 defines a front positional limit, and the back of the module base 102 defines a back positional limit, for the lens barrel assembly 104 within the module space defined by the module base 102.

As illustrated in FIG. 1B, some embodiments include one or more additional components, and/or one or more of the components may be modified, to define positional limits for a lens barrel assembly within a module base. In this regard, the components may define a most forward position to which a lens barrel assembly may be moved within the inner module space defined by the module base (e.g., a front position limit representing a position closest to the front of the module base), and/or a most backward position to which a lens barrel assembly may be moved within the inner module space defined by the module base (e.g., a back position limit representing a position closest to the back of the module base).

The front stop 106 may be a ring-shaped element configured to be mounted on a front portion of the module base 102 to prevent the lens barrel assembly 104 from moving beyond the most forward position during operation of the variable focus lens assembly 100. In other usages, the front stop 106 may be removably attached to the front portion of the module base 102 such that the front stop 106 may be removed to allow maintenance of the lens barrel assembly 104. The holder cover 110 may be another ring-shaped element having similar shape as the lens barrel assembly 104 and diameter slightly greater than that of the lens barrel assembly 104. The holder cover 110 defines a passage for a mid-section of the lens barrel assembly 104 such that an optical axis of the lens barrel assembly 104 and the optical axis of the corresponding image sensor of the variable focus lens assembly 100 are aligned with minimal deviation possible between them. The rear stop 112 may be a ring-shaped element configured to be mounted towards a rear portion of the module base 102 to prevent the lens barrel assembly 104 from moving beyond a first maxima focal position during operation of the variable focus lens assembly 100. The rear stop 112 may be fastened to a groove or recess in the positioning coil board 114 such that the rear stop functions as an optical guide for light incoming from the aperture and the lens barrel assembly 104 towards the image sensor.

Figure 2A:
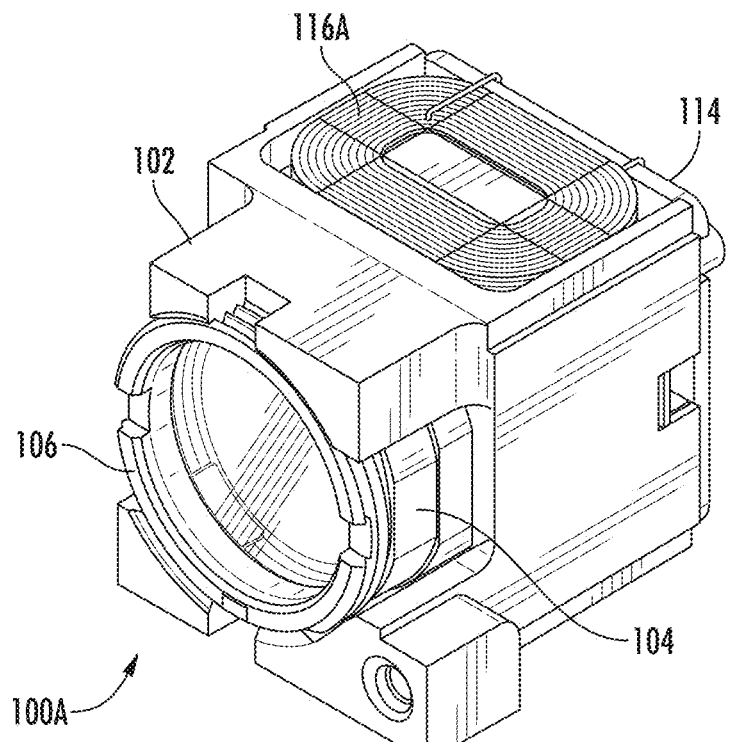
Figure 2B:
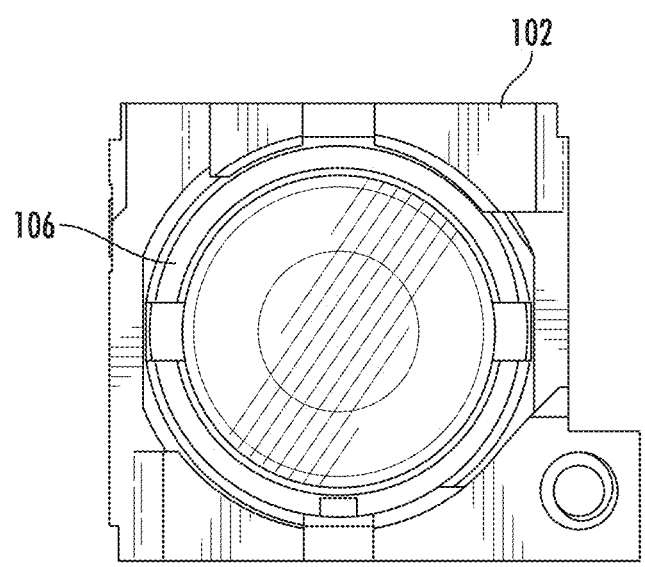
Figure 2C:
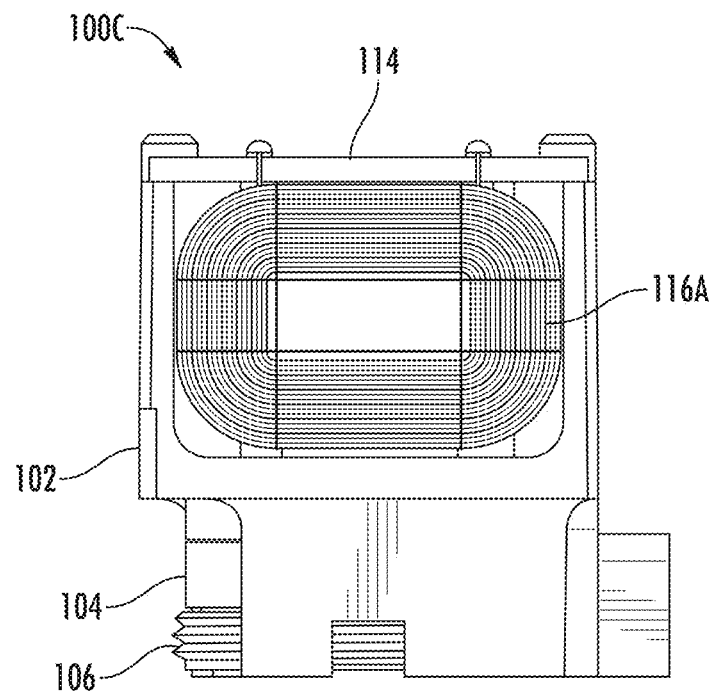
Figure 2D:
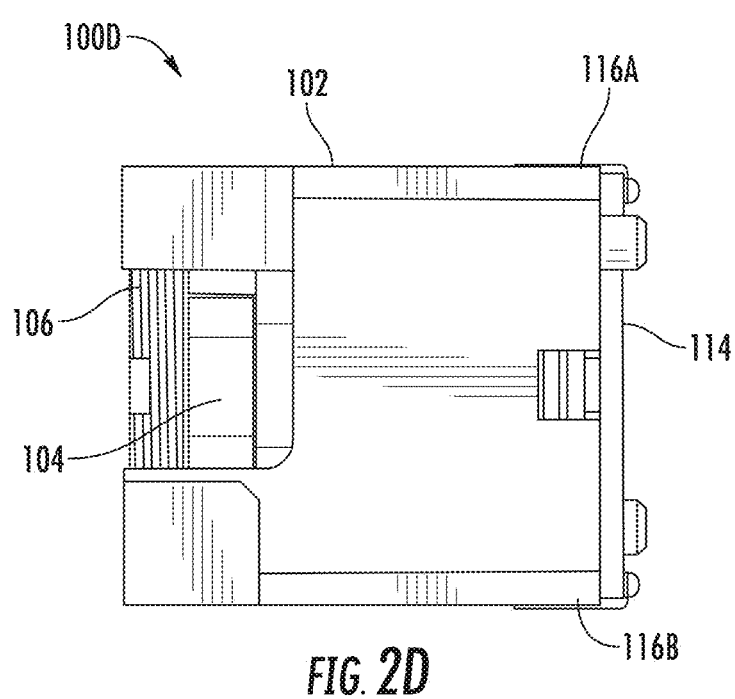

FIGS. 2A-2D illustrate various views of the variable focus lens assembly 100. Specifically, FIG. 2A depicts an assembled view 100A of the variable focus lens assembly 100. FIG. 2B illustrates the variable focus lens assembly 100 from a front perspective view 100B. FIG. 2C depicts a first orthogonal view 100C of the top of the variable focus lens assembly 100. FIG. 2D depicts a second orthogonal view 100D of a side of the variable focus lens assembly 100.

As illustrated the lens barrel assembly 104 is positioned within the inner module space defined by the module base 102. The positioning coil board 114 includes a pair of positioning coil assemblies 116A, 116B located on opposite sides of the module base 102, specifically the top and the bottom, for interacting with the lens barrel assembly 104. In this regard, the lens barrel assembly 104 is engaged with the bearing balls 108A and 108B such that the lens barrel assembly 104 may transverse, or otherwise slide, along the optical axis of the lens barrel assembly 104. For example, the lens barrel assembly 104 may be repositioned based on magnetic forces generated by the positioning coil board 114. The top and bottom positioning coil assemblies of the positioning coil board 114, when in a powered state, create a magnetic force that interact with a default magnetic force between the magnets of the lens barrel assembly to reposition the lens barrel assembly 104 forward or backwards from a default position.

Additionally or alternatively, some embodiments include one or more components for mounting the variable focus lens assembly within and/or connected with one or more apparatuses, such as one or more imaging apparatuses, test apparatuses, and/or the like. For example, some embodiments include a lens mount for mounting the variable focus lens assembly 100 to one or more associated apparatuses. The lens mount may define an inner mount space in which the variable focus lens assembly may be mounted. Additionally or alternatively, the lens mount may include one or more components, such as pins, slot configuration(s), snap configuration(s), and/or the like, or other components, to secure the variable focus lens assembly 100 to the lens mount. Additionally or alternatively still, the lens mount may include one or more elements for attaching to an imaging apparatus, test apparatus, and/or the like. A non-limiting example of a lens mount comprises any of a number of known industry cameras that accept M12 threaded lenses, such as micro video lenses. It should be appreciated that, in other embodiments, a variable focus lens assembly such as the variable focus lens assembly 100 may be mounted directly to an imaging apparatus, test apparatus, and/or the like without use of the lens mount. For example, as described herein, an imaging apparatus may be designed to directly connect the variable focus lens assembly to one or more other components, such as a processor and/or the like, within an apparatus chassis for the imaging apparatus.

FIGS. 3A-3C illustrate various cross-sectional views of interior of an example variable focus lens assembly, in accordance with at least one example embodiments of the present disclosure. Specifically, FIG. 3A illustrates a cut out cross section of the lens barrel assembly 104 and a front portion of the module base 102. As is illustrated, the interior of the lens barrel assembly 104 houses an optical lens 118. FIG. 3B illustrates another cross-sectional view of the variable focus lens assembly 100 showing arrangement of elements inside the lens barrel assembly 104 and the module base 102. As is illustrated, an aperture 122 may be positioned in the front portion of the module base 102 to control the amount of exposure to the image sensor. The lens barrel assembly 104 may include a pair of magnets 120 one each on a top and bottom side of the cross section. Each of the magnets 120 may be positioned in such a manner that at all focal positions, the magnets 120 are in interactable proximity of the positioning coil assemblies 116A and 116B of the positioning coil board 114. FIG. 3C illustrates another cross-sectional view of the variable focus lens assembly 100 showing arrangement of elements in the rear of the variable focus lens assembly 100. As is shown, the rear stop 112 lies adjacent the positioning coil board 114 at the end of the inner space defined in the module base 102.

FIGS. 4A and 4B illustrate details of an example lens barrel assembly, specifically lens barrel assembly 104. FIG. 4A depicts a side view 104A of the lens barrel assembly 104 from a front perspective. FIG. 4B. depicts a side view 104B of the lens barrel assembly 104 from the rear perspective.

As illustrated, the lens barrel assembly 104 includes an open frame lens barrel 124. The open frame lens barrel 124 may be a single piece, or a plurality of connected and/or otherwise melded pieces, forming a housing for the various other components as described. For example, the open frame lens barrel 124 includes a top magnet opening designed to receive a first positioning magnet 420A to be located on top of the lens barrel assembly 104, and the open frame lens barrel 124 includes a bottom magnet opening designed to receive a second positioning magnet 420B to be located on bottom of the lens barrel assembly 104. In some embodiments, the open frame lens barrel 124 is designed such that the first positioning magnet 420A and/or second positioning magnet 420B snap, fit, and/or otherwise are attached and/or located in position without the user of additional structures, components, and/or the like. In yet other embodiment, the first positioning magnet 420A and/or second positioning magnet 420B is/are attached to the open frame lens barrel 124 using one or more adhesives and/or other non-structural elements. Alternatively or additionally, in some embodiments, the positioning magnets 420A and/or 420B are molded into the open frame lens barrel 124 to be locked into position, or otherwise locked into the open frame lens barrel 124 with one or more thermal setting features. For example, in some embodiments, at least a portion of the open frame lens barrel 124 is melted down over one or more of the positioning magnets 420A and/or 420B to secure the positioning magnets 420A and/or 420B in place.

As illustrated in FIGS. 4A and 4B, one or more of the positioning magnets 420A and 420B may be located within the light path defined by the apertures of the open frame lens barrel 124. In this regard, the overall dimensions of the lens barrel assembly 104 may be minimized by ensuring the positioning magnet(s) do not require placement above the open frame lens barrel 124. For example, in some embodiments, the positioning magnet(s) may each be of a particular height equal to and/or lesser than the thickness of the open frame lens barrel 124 such that the positioning magnets do not increase the total height for the lens barrel assembly. In one or more embodiments, the open frame lens barrel 124 is designed and/or modified to include one or more defined spaces for supporting the positioning magnet(s). For example, as illustrated, the first positioning magnet 420A is positioned at the top of the open frame lens barrel 124 and the second positioning magnet 420B is positioned at the bottom of the open frame lens barrel 124. In this regard, the positioning magnets 420A and 420B may be located opposite one another within the lens barrel assembly 104 to evenly affect the position of the lens barrel assembly 104 without increasing the overall size of the lens barrel assembly 104.

Additionally or alternatively, one or more of the positioning magnets 420A and/or 420B may be specially designed to minimize the effects of the positioning magnet being in the light path. As illustrated, the first and second positioning magnets 420A and 420B are each positioned within the light path to minimize the form factor of the assembly, which may cause unwanted light reflection off one or more of the positioning magnets 420A and/or 420B to be reduced for improved functionality. For example, in some embodiments, one or more of the first positioning magnet 420A and/or second positioning magnet 420B comprises a non-glossy dark surface. The non-glossy dark surface may minimize the effects of light reflections off the first positioning magnet 420A and/or second positioning magnet 420B affecting one or more associated image sensors. It should be appreciated that the non-glossy dark surface of one or more of the positioning magnets may be obtained in any of a number of ways. For example, in some embodiments, one or more of the first positioning magnet 420A and/or second positioning magnet 420B include a magnet surface epoxy. The magnet surface epoxy may be applied to the positioning magnet(s) to cause such positioning magnet(s) to have a non-glossy dark surface without noticeably increasing the dimensions of the positioning magnet(s) and/or affecting the functionality of such positioning magnet(s). In at least one example embodiment where one or more of the positioning magnets comprises a glossy and/or reflective material, for example a zinc and/or nickel plating, the magnet surface epoxy may cover the glossy and/or reflective surface without affecting the form factor and/or functionality of the positioning magnet(s). In some embodiments one or more of the positioning magnets may be constructed of a non-glossy dark material, such that the positioning magnet(s) include a non-glossy dark surface upon being manufactured and/or otherwise without additional steps.

The open frame lens design includes a plurality of slots configured to enable engagement with one or more other components, for example of the variable focus lens assembly. For example, in some embodiments the open frame lens barrel 404 includes one or more bearing slots designed to receive one or more bearing balls. As illustrated in FIGS. 4A and 4B, the lens barrel 124 includes a pair of front bearing slots 126A and 126B and a pair of rear bearing slots 128A and 128B. Each of the bearing slots may be a cut out recess in the open frame lens barrel 124 such that the recess has a semi-circular shape when viewed from a plane orthogonal to the run of the recess. That is, as a whole, the recess is hollow half cylindrical or semi-tubular in shape.

Additionally, as is illustrated, the pair of front bearing slots 126A and 126B and the pair of rear bearing slots 128A and 128B are positionally crossed with respect to each other. Such a configuration provides ample movable support to the lens barrel assembly 104 while reducing the friction encountered during movement of the lens barrel assembly 104. Consequently, the amount of force and hence the current required to move the lens barrel assembly 104 is smaller in comparison to what would have been with full ball bearings. For a miniature sized application, such a reduction in friction and thereby the current provides for performance improvement in the underlying device/apparatus.

Additionally or alternatively, in some embodiments, the open frame lens barrel 124 includes one or more openings to enable access to one or more limit screws. For example, in this regard, the open frame lens barrel 124 may include one or more additional openings located in the opposite corners of one or more bearing slots, for example bearing slots 408B. The additional openings may be sufficiently sized to enable one or more instruments to pass through the openings to engage one or more limit screws for adjustment. Example instruments include a screwdriver, hex key, and/or the like, for engaging one or more limit screws, and/or other positioning limit components. In some embodiments, the additional openings enable access to back limiting screws, and/or other back positioning limit components, from the front of the lens barrel assembly.

Further as illustrated, the open frame lens barrel 124 defines a front and back aperture to enable light to traverse through the open frame lens barrel 124. The apertures may define an inner barrel space defined to house one or more optical elements. For example, as illustrated, the open frame lens barrel 124 defines circular apertures associated with the imaging lens 118 of the open frame lens barrel 124. In some embodiments, for example as illustrated, one or more of the positioning magnets, such as the first positioning magnet 420A and/or second positioning magnet 420B, are within the light path defined by the back aperture of the open frame lens barrel 124.

The imaging lens 118 includes one or more optical components for concentrating, refracting, and/or otherwise manipulating light entering the open frame lens barrel. In some embodiments, the imaging lens 118 comprises a plurality of sub-lenses designed to manipulate, in a desired manner, the light traversing through the aperture. For example, the imaging lens 118 may be designed to angle light for capture at one or more desired points, such as at a location of an associated image sensor. The imaging lens 118 may be constructed of any number of materials, for example glass, optical plastic, and/or the like, or a combination thereof. Additionally or alternatively, the imaging lens 118 may be constructed of one or more lenses embodying any number of lens designs.

FIGS. 5A-5C illustrate perspective views of a module base of an example variable focus lens assembly in accordance with at least one example embodiment of the present disclosure. Specifically, FIG. 5A illustrates a first tilted perspective view 102A of the module base 102 from a front side of the module base 102. FIG. 5B illustrates a second tilted perspective view 102B of the module base 102 from a rear side of the module base 102. FIG. 5C illustrates an orthogonal perspective view 102B of the module base 102 from a rear side of the module base 102.

As is illustrated in FIG. 5A, the module base 102 comprises a front elongated portion A defined by two arc shaped portions of the housing constituting the module base 102 on the side facing the scene to be imaged. The front elongated portion A defines a recess for inserting the lens barrel assembly 104 into the module base 102 to assemble the variable focus lens assembly 100. The module base further comprises a mounting base portion B that extends beyond a side face of the module base 102 as shown in FIGS. 5A-5C. The mounting base portion comprises a recess B1 to receive a fastening mechanism such as a screw, a pin, a bolt or the like to securely mount the variable focus lens assembly 100 into a device such as an imaging apparatus. Further, as is illustrated in FIG. 5C, the module base comprises two pairs of bearing slots, one pair on each of the front side and the rear side of the module base 102. The first pair of front bearing slots 126A' and 126B' lie on a front side of the module base 102 and are configured to align with the front bearing slots 126A and 126B respectively of the lens barrel assembly 104. The second pair of rear bearing slots 128A' and 128B' lie on a rear side of the module base 102 and are configured to align with the rear bearing slots 128A and 128B respectively of the lens barrel assembly 104. As such, a bearing ball may be inserted into each of the semicircular/semi cylindrical slots of the lens barrel assembly 104 and the bearing ball fitted lens barrel assembly 104 may then be inserted into the module base 102 during assembling of the variable focus lens assembly 100. In such a configuration, the lens barrel assembly 104 is movably secured into the module base 102 with the aid of the bearing balls 108A and 108B and thus the lens barrel assembly 104 is movable in the inner module space of the module base 102. As described, this alignment enables the lens barrel assembly 104 to be sufficiently supported for alignment and/or positing by the bearing balls through engagement with the bearing slots of the lens barrel assembly 104 and the module base 102.

Additionally, the aligned design of the bearing slots enables the lens barrel assembly 104 to traverse with the bearing balls.

FIG. 6 illustrates various design detailed of an example positioning coil board in accordance with at least one example embodiment of the present disclosure. Specifically, FIG. 6 depicts a first perspective view of the positioning coil board 114. It should be appreciated that similar details may be present in one or more other implementations of a positioning coil board, for example positioning coil board 114 as described herein.

The positioning coil board 114 includes a coil connection board 602. The coil connection board 602 embodies hardware, circuitry, and/or the like for connecting one or more subassemblies of the positioning coil board 114. In this regard, the coil connection board 602 may be embodied by conductive material configured to receive an electric current to power one or more subassemblies of the positioning coil board 114, such as one or more positioning coil assemblies and/or components thereof. For example, the coil connection board 602 receive an electrical current to power the first positioning coil 604A and/or second positioning coil 604B. In some example embodiments, the positioning coil board 114 may be fixedly attached to the module base.

The coil connection board 602 further includes a first limit component opening 608. The first limit component opening 608 may be located opposite a second limit component opening (not depicted). In this regard, the first and/or second limit component openings may be designed to engage with one or more limit components, for example together with associated limit component openings of one or more other components such as a module base. For example, as described, the first limit component opening 608 may engage one of the back limit screws for setting a back positional limit for an associated lens barrel assembly. Similarly, the second limit component opening may engage the other of the back limit screws. In this regard, the limit components may extend through both limit component openings of the positioning coil board 114 and an associated module base.

The positioning coil board 114 further comprises a first positioning coil 604A and a second positioning coil 604B (collectively "positioning coils 604"). Each of the positioning coils 604 may comprise a wound length of electrically conductive wire. In this regard, each of the positioning coils 604 may be powered to a powered state based on the electrical current passed through the positioning coil of the positioning coils 604. It should be appreciated that each of the positioning coils 604 may comprise the same material, for example copper wire, coated copper wire, tinned wire, and/or the like. It should be appreciated that, in some embodiments, each of the positioning coils 604 is designed to generate the same strength magnetic field as the other of the positioning coils 604 in a circumstance where the coil is set to the same powered state.

As illustrated, each of the positioning coils 604 defines a coil inner region comprising an open space between the wire coil. In this regard, the positioning coil board 157 may include a positioning pad located in the coil inner region for each of the positioning coils 604. Specifically, as illustrated, the first positioning pad 606A is located in a first coil inner region of the first positioning coil 604A. Additionally, the second positioning pad 606B is located in a coil inner region of the second positioning coil 604B. In this regard, each of the first positioning pad 606A and the second positioning pad 606B (collectively "positioning pads 606") may comprise particular volumetric dimensions specific to fit within the inner region defined by the corresponding positioning coil.

In some embodiments, each of the positioning pads 606 comprises a component of magnetic material. For example, in some embodiments, each of the positioning pads 606 comprise a mass of iron, or majority iron, designed to fit within the coil inner region of the corresponding positioning coil. In this regard, each of the positioning pads 606 may be configured to interact with one or more magnets of a variable focus lens assembly when assembled, such as where the positioning magnets of a lens barrel assembly are aligned with each of the positioning pads 606 when the variable focus lens assembly is assembled for operation and when each of the positioning coils 604 are in a non-powered state. For example, the first positioning pad 606A may interact with a first positioning magnet of a lens barrel assembly. Similarly, the second positioning pad 606B may interact with a second positioning magnet of the lens barrel assembly.

In some embodiments, each of the positioning pads 606 is secured within the coil inner region using any of a myriad of manners. For example, in some embodiments, one or more for the positioning pads 606 is secured using one or more adhesives. Additionally or alternatively, in some embodiments, each inner coil region is defined by a coil frame. In some such embodiments, each coil frame may be molded entirely and/or partially around the corresponding positioning pad of the positioning pads 606 to secure the corresponding positioning pad. In some such embodiments, the coiled wire is wound around the coil frame.

As illustrated, the first positioning coil 604A is located opposite the second positioning coil 604B. Similarly in this regard, the first positioning pad 606A is located opposite the second positioning pad 606B. Accordingly, the first positioning pad 606A may interact with a first positioning magnet of a lens barrel assembly, and the second positioning pad 606B may interact with a second positioning magnet of the lens barrel assembly, to maintain and/or cause adjusting of the position of the lens barrel assembly within a module base. For example, in at least one example context, the first positioning pad 606A, a first positioning magnet of a lens barrel assembly, the second positioning pad 606B, and a second positioning magnet of the lens barrel assembly, are all aligned in a default state based on a default magnetic force between the positioning magnets and corresponding positioning pad of the positioning pads 606A, such as when each of the positioning coils 604 are in a non-powered state.

The first positioning coil 604A may be powered to a first powered state to generate a first magnetic field, and the second positioning coil 604B may be powered to generate a second magnetic field symmetric to that of the first magnetic field. Accordingly, the first magnetic field and second magnetic field may cancel out with respect to one or more directions opposite one another. In this regard, the interaction of the first magnetic field and second magnetic field may result in a resulting magnetic field providing a force in only one direction, for example representing a lateral direction of a lens barrel assembly. This resulting magnetic force may further interact with the default magnetic force between the positioning magnet(s) of a lens barrel assembly and the positioning pads 606A to move the lens barrel assembly to a new focus position, as described herein, based on the resulting magnetic force.

Having described example assemblies and component details for the various components of the assembly, additional description is provided with respect to operation of variable focus lens assemblies for image capture. Additionally or alternatively, additional description is provided regarding the focus position of a variable focus lens assembly for purposes of image capture. It should be appreciated that, based on the above disclosure, one or more of the lens assemblies as described may be utilized for image capture in any of the contexts described.

FIGS. 7A and 7B illustrate the traversal of light through a variable focus lens assembly for capture by an associated image sensor, in accordance with at least one example embodiment of the present disclosure. Specifically, FIG. 7A depicts a side cross-sectional view of a variable focus lens assembly, with light trace visualization, and a corresponding image sensor. FIG. 7B depicts a front perspective view of the variable focus lens assembly, with light trace visualization, and the corresponding image sensor. In some embodiments, for example, the components as depicted may be integrated into an imaging apparatus as described herein.

FIGS. 7A and 7B include an image sensor 702. In some embodiments, the image sensor 702 is configured to capture an image data object representing incoming light interacting with the image sensor 702. Specifically, as illustrated, the light may be traversed through one or more optical components, such as the variable focus lens assembly 100. In this regard, the image sensor 702 may convert the light waves that interact with the image sensor 702 into data represented in the corresponding captured image data object.

The variable focus lens assembly 100, as illustrated, is located in front of the image sensor 702. In this regard, light that reaches the image sensor 702 may traverse through one or more apertures defined by the variable focus lens assembly 100, and/or optical elements positioned therein. For example, as illustrated, incoming light may enter the front of the variable focus lens assembly 100 and interact with one or more imaging lenses of the variable focus lens assembly 100 before exiting the variable focus lens assembly 100 and interacting with the image sensor 702. In this regard, the variable focus lens assembly 100 and/or various subcomponents thereof may manipulate the incoming light to reorient the light towards the image sensor 702 and/or one or more target portions of the image sensor 702.

Light trace 704 represents an example visualization of the manipulation of light rays that transverse through the variable focus lens assembly. As illustrated, the light trace 704 depicts incoming light that is reflected, refracted, and/or otherwise manipulated by the variable focus lens assembly for capture by the image sensor 702. Specifically, as illustrated, incoming light may interact with one or more imaging lenses of a lens barrel assembly of the variable focus lens assembly 100, and/or one or more components of the lens barrel assembly such as an open frame lens barrel housing such image lens(es). In this regard, as illustrated by the light trace 704, at least some of the incoming light may be reflected towards the image sensor 702 upon interacting with the open frame lens barrel. Similarly, at least some incoming light may be angled towards one or more specific portions of the image sensor 702 to enable capture of an image data object representing the incoming light.

The light trace 704 may be changed based on one or more changes to aspect(s) of the variable focus lens assembly 100. For example, in some embodiments, the focus position of the lens barrel assembly within the variable focus lens assembly 100 alters the manipulation of light by the variable focus lens assembly 100, such that incoming light at a particular point may interact with the image sensor 702 at different point(s) based on the focus position of the lens barrel assembly. Accordingly, by repositioning the lens barrel assembly within the variable focus lens assembly 100, the image data object captured by the image sensor 702 may change to reflect the adjusted focus position. In some such embodiments, repositioning the lens barrel assembly within the variable focus lens assembly 100 causes objects at a particular focus range corresponding to the focus position to be reflected more clearly within the captured image data object, for example as described herein with respect to image data objects including representations of one or more visual coded indicia.

FIGS. 8A, 8B, and 8C illustrate example visualizations of a lens barrel assembly positioned at different focus positions within a module base of a variable focus lens assembly. Specifically, FIG. 8A depicts a lens barrel assembly at a first focus position, the first focus position designated for neutral field focusing. FIG. 8B depicts the lens barrel assembly at a second focus position, the second focus position designated for far field focusing. FIG. 8C depicts the lens barrel assembly at a third focus position, the third focus position designated for near field focusing.

FIG. 8A depicts the lens barrel assembly 104 within the module base 102 at a first focus position for neutral field focusing. In some such embodiments, the focus position is defined based on an offset of the lens barrel assembly 104 from a default position. The default position may be defined by the position of the lens barrel assembly 104 when one or more coil positioning assemblies of the variable focus lens assembly 100 are in a non-powered state, or in other embodiments a default powered state. For example, in some embodiments, the lens barrel assembly 104 is located at a middle focus position in a non-powered state, the middle focus position defining a default focus position when in the non-powered state (e.g., zero current via the positioning coil assemblies). In some such embodiments where the coil positioning assemblies are in a non-powered state, the lens barrel assembly 104 may be positioned within the variable focus lens assembly 100 based on a default magnetic force between one or more positioning magnets of the lens barrel assembly 104 and one or more positioning pads of the variable focus lens assembly 100.

For purposes of description, the focus position associated with the lens barrel assembly 104 may be defined with regard to one or more offsets with respect to one or more particular axes associated with the positioning pads of the variable focus lens assembly 100 and/or positioning magnets of the lens barrel assembly 104, and corresponding offsets to the front and back of the module base 102 within which the lens barrel assembly 104 is aligned. For example, FIGS. 8A, 8B, and 8C each include the pad front axis 802A depicting a front axis of the pair of positioning pads for the variable focus lens assembly 100, a pad center axis 802B depicting a center axis for the pair of positioning pads of the variable focus lens assembly 100, and a pad back axis 802C representing a rear axis for the pair of positioning pads of the variable focus lens assembly 100.

As illustrated in FIG. 8A, in at least one example embodiment, at the neutral focus position the lens barrel assembly 104 in the inner module space is positioned such that the positioning magnets of the lens barrel assembly 104 align with the various axes associated with the pair of positioning pads. In this regard, the front of the positioning magnets 420A and 420B is aligned with the pad front axis 802A, the back of the positioning magnets 420A and 420B is aligned with the pad back axis 802C, and the center of the positioning magnets 420A and 420B is aligned with the pad center axis 802B. In other embodiments, at the neutral focus position, the center of the positioning magnets 420A and 420B may align with the pad center axis 802B, but the front of the positioning magnets 420A and 420B may not align with the pad front axis 802A and/or the back of the positioning magnets 420A and 420B may not align with the pad back axis 802C. For example, in some such embodiments, the positioning magnets 420A and 420B may each be bigger or smaller in width than the positioning pads, such that the front and/or back of the positioning magnets 420A and 420B are not aligned with the positioning pads when the centers of the positioning magnets 420A and 420B align with the center of the positioning pads.

As illustrated in FIG. 8A, when the lens barrel assembly 104 is positioned at the neutral focus position, the front of the lens barrel assembly 104 is spaced by a first offset from the inner wall of the front of the module base 102. Specifically, as illustrated, the inner wall of the front of the module base 102 is spaced from the front of the variable focus lens assembly 100 by the neutral focus frontal position offset. The neutral focus frontal position offset may be designed as a predetermined distance between the front of the lens barrel assembly 104 and the inner wall of the front of the module base 102 when the lens barrel assembly 104 is at a neutral focus position. In some embodiments, the neutral focus frontal position offset represents a maximum distance that the lens barrel assembly 104 may be moved forward from the neutral focus position for example to focus the variable focus lens assembly 100 for improved near field focusing.

Further, when the lens barrel assembly 104 is positioned at the neutral focus position, the back of the lens barrel assembly 104 is spaced by a second offset from inner wall of the back of the module base 102. Specifically, as illustrated, the inner wall of the back of the module base 102 is spaced from the back of the lens barrel assembly 104 by the neutral focus back position offset. The neutral focus back position offset may be designed as a predetermined distance between the back of the lens barrel assembly 104 and the inner wall of the back of the module base 102 when the lens barrel assembly 104 is at the neutral focus position. In some embodiments, the neutral focus back position offset represents a maximum distance that the lens barrel assembly 104 may be moved backwards from the neutral focus position, for example to focus the variable focus lens assembly 100 for improved far field focusing.

As illustrated in FIG. 8B, in at least one example embodiment, at a far focus position the lens barrel assembly 104 is positioned such that the positioning magnets 420A and 420B of the lens barrel assembly 104 are offset from the various axes associated with the pair of positioning pads by a far position magnetic offset. In this regard, the front of the positioning magnets is shifted backwards from the pad front axis 802A by the far position magnetic offset, the back of the positioning magnets is shifted backwards from the pad back axis 802C by the near position magnetic offset, and the center of the positioning magnets is shifted backwards from the pad center axis 802B by the near position magnetic offset. In other embodiments, for example where the positioning magnets are larger and/or smaller than the positioning pads, only the center of the positioning magnets 420A and 420B is offset from the pad center axis 802B by the far position magnetic offset.

The far focus position may be defined by the position of the lens barrel assembly 104 when one or more coil positioning assemblies of the variable focus lens assembly 100 are in a first powered state, for example a far focus powered state. In some such embodiments where the coil positioning assemblies are in the far focus powered state, the lens barrel assembly 104 may be positioned within the variable focus lens assembly 100 based on the magnetic force created by the coil positioning assemblies in the far focus powered state together with the default magnetic force between one or more positioning magnets of the lens barrel assembly 104 and one or more positioning pads of the variable focus lens assembly 100. For example, in this regard, the interaction between the magnetic forces may result in a resulting magnetic force defining the far focus position.

As illustrated, when the lens barrel assembly 104 is positioned at the far focus position, the back of the lens barrel assembly 104 is positioned as far backwards as possible within the module base 102. In this regard, there is no back position offset between the inner wall of the back of the module base 102 and the back of the lens barrel assembly 104. In some such embodiments, the inner wall of the back of the module base 102 may be in contact with the back of the lens barrel assembly 104 to stop the lens barrel assembly 104 from moving any further backwards. In other embodiments, at the far focus position, the lens barrel assembly 104 may be in contact with one or more back limit components, such as back limit screws. It should be appreciated that, as illustrated, the far focus position may be positioned backwards from the neutral focus position by the distance represented by the neutral focus back position offset.

Further, when the lens barrel assembly 104 is positioned at the far focus position, the front of the lens barrel assembly 104 is spaced by a second offset from the inner wall of the front of the module base 102. Specifically, as illustrated, the inner wall of the front of the module base 102 is spaced from the front of the lens barrel assembly 104 by the far focus frontal position offset. The far focus frontal position offset may represent a distance equal to the neutral focus back position offset added to the neutral focus frontal position offset. In other words, in some such embodiments, the far focus frontal position offset represents the maximum distance the front of the lens barrel assembly 104 can be located from the inner wall of the front of the module base 102. It should be appreciated that, to move the lens barrel assembly 104 to the far focus position, the magnetic offset may match the neutral focus back position offset as described above. It should be appreciated that moving the lens barrel assembly 104 may improve the far field focusing of the variable focus lens assembly 100.

As illustrated in FIG. 8C, in at least one example embodiment, at a near focus position the lens barrel assembly 104 is positioned such that the positioning magnets of the lens barrel assembly 104 are offset from the various axes associated with the pair of positioning pads by a near position magnetic offset. In this regard, the front of the positioning magnets is shifted forward from the pad front axis 802A by the near position magnetic offset, the back of the positioning magnets is shifted forward from the pad back axis 802C by the near position magnetic offset, and the center of the positioning magnets is shifted forward from the pad center axis 802B by the near position magnetic offset. In other embodiments, for example where the positioning magnets are larger and/or smaller than the positioning pads, only the center of the positioning magnets is offset from the pad center axis 802B by the near position magnetic offset.

The near focus position may be defined by the position of the lens barrel assembly 104 when one or more coil positioning assemblies of the variable focus lens assembly 100 are in a second powered state, for example a near focus powered state. In some such embodiments where the coil positioning assemblies are in the near focus powered state, the lens barrel assembly 104 may be positioned within the variable focus lens assembly 100 based on the magnetic force created by the coil positioning assemblies in the near focus powered state together with the default magnetic force between one or more positioning magnets of the lens barrel assembly 104 and one or more positioning pads of the variable focus lens assembly 100. For example, in this regard, the interaction between the magnetic forces may result in a resulting magnetic force defining the near focus position.

As illustrated, when the lens barrel assembly 104 is positioned at the near focus position, the front of the lens barrel assembly 104 is positioned as forward as possible within the module base 102. In this regard, there is no frontal position offset between the inner wall of the front of the module base 102 and the front of the lens barrel assembly 104. In some such embodiments, the module base 102 may be in contact with the lens barrel assembly 104 to stop the lens barrel assembly 104 from moving any more forward. In other embodiments, at the near focus position, the lens barrel assembly 104 may be in contact with one or more front limit components, such as front limit screws as described with respect to variable focus lens assembly 150. It should be appreciated that, as illustrated, the near focus position may be positioned forward from the neutral focus position by the distance represented by the neutral focus frontal position offset.

Further, when the lens barrel assembly 104 is positioned at the near focus position, the back of the lens assembly 104 is spaced by a second offset from the inner wall of the back of the module base 102. Specifically, as illustrated, the inner wall of the back of the module base 102 is spaced from the back of the lens barrel assembly 104 by the near focus back position offset. The near focus back position offset may represent a distance equal to the neutral focus back position offset added to the neutral focus frontal position offset. In other words, in some such embodiments, the near focus back position offset represents the maximum distance the back of the lens barrel assembly 104 can be located from the inner wall of the module base 102. It should be appreciated that, to move the lens barrel assembly 104 to the near focus position, the magnetic offset may match the neutral focus frontal position offset as described above. It should be appreciated that moving the lens barrel assembly 104 may improve the near field focusing of the variable focus lens assembly 100.

It should be appreciated that the focus positions described above are merely exemplary for purposes of description and illustration. In other embodiments, the lens barrel assembly may be positioned continuously within the module base. In this regard, for example, the positioning coil assemblies of the variable focus lens assembly 100 may be powered to any number of powered states. Each of the powered states may correspond to a resulting magnetic force defining a different focus position. In some such embodiments, as the lens barrel assembly 104 is positioned more forward within the module base 102 along a continuous spectrum of focus positions, the near field focusing of the variable focus lens assembly 100 improves. Similarly, in some such embodiments, as the lens barrel assembly 104 is positioned more backwards within the module base 102 along a continuous spectrum of focus positions, the far field focusing of the variable focus lens assembly 100 improves.

FIGS. 9A, 9B, and 9C each illustrate a visualization of an image data object including representations of various visual encoded indicia captured by an image sensor using a variable focus lens assembly having a lens barrel assembly at different focus positions. Specifically, each of FIGS. 9A, 9B, and 9C depict a near-field indicia at a first distance the variable focus lens assembly, a neutral-field indicia at a second distance from the variable focus lens assembly, and a far-field indicia at a third distance from the variable focus lens assembly. In one example context, for example as illustrated, the near-field indicia may be positioned 1 meter from the variable focus lens assembly, the neutral-field indicia may be positioned 1.8 meters from the variable focus lens assembly, and the far-field indicia may be positioned 6 meters from the variable focus lens assembly. It should be appreciated that, in other embodiments, the near-field indicia, neutral field indicia, and/or far-field indicia may be positioned at alternative distances to those described above, for example where the far-field indicia is positioned further than the neutral-field indicia positioned further than the near-field indicia.

FIG. 9A depicts an image data object representing the various visual encoded indicia as captured using a lens barrel assembly at a default focus position, for example as depicted with respect to FIG. 8A. In this regard, the lens barrel assembly may be positioned to enable capture of the visual encoded indicia at medium or determined middle-range, distances in better focus, for example at and/or around 1.8 meter from the lens barrel assembly.

FIG. 9A includes a first representation of the far-field indicia 902A, a first representation of the neutral-field indicia 904A, and a first representation of the near-field indicia 906A. As illustrated, the first representation of the far-field indicia 902A is not in focus, such that the captured representation is blurry due to not being at a distance close to the focus range associated with the neutral focus position of the lens barrel assembly. Similarly, the first representation of the near-field indicia 906A is also not in focus, such that the captured representation is blurry as also not being at a distance close to the focus range associated with the neutral focus position of the lens barrel assembly. However, in this regard, the near-field indicia 906A is closer to the focus range associated with the near focus position for the lens barrel assembly, and as such in better focus than the representation of the far-field indicia 902A. The first representation of the neutral-field indicia 904A is best in focus as the focus range for the neutral focus position matches, and/or is closest to, the distance at which the neutral-field indicia is located. As such, objects at this distance are represented most clearly in captured image data objects. As such, when the lens barrel assembly is positioned in at the neutral focus position, the visual encoded indicia at the focus range associated with the neutral focus position for the lens barrel assembly, for example 1.8 meters, may be most likely to be successfully detected and/or successfully decoded from the image data object.

FIG. 9B depicts an image data object representing the various visual encoded indicia as captured using a lens barrel assembly at a near focus position. In this regard, the lens barrel assembly may be positioned to enable capture of the visual encoded indicia at close distances in better focus, for example at and/or around 1 meter from the lens barrel assembly. FIG. 9B includes a second representation of the far-field indicia 902B, a second representation of the neutral-field indicia 904B, and a third representation of the near-field indicia 906B. As illustrated, the second representation of the far-field indicia 902B is least in focus, such that the captured representation is blurry for being the furthest from the focus range corresponding to the near focus position of the lens barrel assembly. Further in this regard, the second representation of the neutral-field indicia 904B is more in focus than the far-field indicia 902B, however the neutral-field indicia 904B remains partially blurred as the focus range for the neutral focus position is not equal to the distance at which the neutral-field indicia is located. As such, the second representation of the near-field indicia 906B is the most in focus, for example such that the data represented in the image data object most clearly represents the visual encoded indicia. In this regard, the focus range for the near focus position may match, or most closely match, the distance for the near-field indicia, such that objects at this distance are represented most clearly in captured image data objects. As such, visual encoded indicia at the near focus range associated with the near focus position for the lens barrel assembly, for example 1 meter, may be most likely to be successfully detected and/or successfully decoded from the image data object.

FIG. 9C depicts an image data object representing the various visual encoded indicia as captured using a lens barrel assembly at a far focus position. In this regard, the lens barrel assembly may be positioned to enable capture of the visual encoded indicia at far distances in better focus, for example at and/or around, or more than, 6 meters from the lens barrel assembly. FIG. 9C includes a third representation of the far-field indicia 902C, a third representation of the neutral-field indicia 904C, and a third representation of the near-field indicia 906C. As illustrated, the third representation of the near-field indicia 906C is least in focus, such that the captured representation is blurry for being the furthest from the focus range corresponding to the far focus position of the lens barrel assembly. Further in this regard, the third-representation of the neutral-field indicia 904B is more in focus than the third representation of the near-field indicia 906C, however the third representation of the neutral-field indicia 904C remains partially blurred as the focus range for the far focus position is not equal to the distance at which the neutral-field indicia is located. As such, the third representation of the far-field indicia 902C is the most in focus, for example such that the data represented in the image data object most clearly represents the visual encoded indicia. In this regard, the focus range for the far focus position may match, or most closely match, the distance for the far-field indicia, such that objects at this distance are represented most clearly in captured image data objects. As such, visual encoded indicia at the far focus range associated with the far focus position for the lens barrel assembly, for example 6 meter, may be most likely to be successfully detected and/or successfully decoded from the image data object.

It should be appreciated that the illustrated representations are merely exemplary. In other embodiments, such representations may become better in focus by positioning the lens barrel assembly at one or more other focus positions. For example, in some other embodiments, a representation of a visual encoded indicia at 3 meters may be in focus at an additional focus position between the neutral focus position and the far focus position along a continuous focus position spectrum.

Having described the physical configuration of the focus position of the lens barrel assembly, details are now provided regarding the magnetic forces that cause repositioning of the lens barrel assembly and functionality details associated with variable focus lens assemblies. It should be appreciated that the specific details, and/or implementation values, described are merely exemplary. Indeed, in other embodiments similar implementations may be utilized similar to that described and depicted. In this regard, the specific implementations as depicted and/or described should be understood not to limit the scope and/or spirit of this disclosure.

FIGS. 10A and 10B illustrate the magnetic forces exerted by each of a pair of coil positioning assemblies associated with a pair of positioning magnets of a variable focus lens assembly, in accordance with at least some example embodiments of the present disclosure. Specifically, FIG. 10A depicts the magnetic forces exerted by each of a pair of coil positioning assemblies associated with a pair of positioning magnets of a variable focus lens assembly in a circumstance where the pair of coil positioning assemblies are in a non-powered state. FIG. 10B depicts the magnetic forces exerted by each of a pair of coil positioning assemblies associated with a pair of positioning magnets of a variable focus lens assembly in a circumstance where the pair of coil positioning assemblies are in a first powered state.

As illustrated in FIG. 10A, a first positioning magnet in combination with a first positioning coil assembly exerts a first magnet-coil force 1002. For example, in this regard, the first positioning magnet and first positioning coil assembly may be located towards the top of the variable focus lens assembly. Similarly, a second positioning magnet in combination with a second positioning coil assembly exerts a second magnet-coil force 1004. For example, the second positioning magnet and second positioning coil assembly may be located towards the top of the variable focus lens assembly.

The first magnet-coil force 1002 may be symmetric with respect to the second magnet-coil force 1004. The magnetic forces 1002 and 1004 may be generated opposite one another, such that the first magnet-coil force 1002 combines with the second magnet-coil force 1004 along a desired direction of movement (e.g., forward or backwards) to improve the efficiency for moving the lens barrel assembly in the desired direction, and counteracts in one or more orthogonal directions not required for such movement (for example, towards one or more positioning pads). In this regard, in some such embodiments, the lens barrel assembly may remain at a default focus position despite the presence of the first magnet-coil force 1002 and second magnet-coil force 1004. In some such embodiments, the first magnet-coil force 1002 and second magnetic-coil force 1004 may move the lens barrel assembly to a default focus position, and/or move the lens barrel assembly along an axis of movement to another focus position based on a current direction and current strength of the current flowing through each of a pair of positioning coil assemblies. As such, the first magnet-coil force 1002 in combination with the second magnet-coil force 1004 may define the default focus position for the lens barrel assembly within the module base.

FIG. 10B illustrates a third magnet-coil force 1052 and a fourth magnet-coil force 1054. The third magnet-coil force 1052 maybe exerted by the top positioning magnet in combination with the top positioning coil assembly powered to a first powered state. Similarly, the fourth magnet-coil force 1054 may be exerted by the bottom positioning magnet in combination with the bottom positioning coil assembly powered to the first powered state. As illustrated, the third magnet-coil force 1052 includes at least some magnetic forces symmetric but opposite to at least some magnetic forces exerted by the fourth magnet-coil force 1054. Such opposite magnetic forces may counteract such that there is no net magnetic force in such directions, for example orthogonal to a direction of movement enabled by engagement of the lens barrel assembly with one or more bearing balls. Additionally, the third magnet-coil force 1052 and the fourth magnet-coil force 1054 each exert magnetic forces in the same direction parallel to the direction of movement enabled by engagement of the lens barrel assembly with one or more bearing balls (for example, towards the front of the module base). These magnetic forces may be applied to the lens barrel assembly to reposition the lens barrel assembly to a new focus position. It should be appreciated that in a circumstance where the positioning coil assemblies are powered to a different powered state, for example to a negative state as compared to the first powered state, the generated magnetic forces may be in the opposite direction parallel to the optical axis, for example such that the magnetic forces are applied to the lens barrel assembly to cause movement in the other direction (for example, towards the back of the module base).

FIG. 11 illustrates an example distribution of the force in relation to displacement. Specifically, as illustrated, the distribution includes a graph 1150 of the displacement of the lens barrel assembly as compared to the exerted magnetic force. In this regard, the front of the module base may be associated with a positive displacement, and the back of the module base may be associated with a negative displacement. Specifically, as illustrated, at a default and/or otherwise neutral focus position (e.g., 0.00 um), the magnetic force is approximately 22 mN. As the displacement increases in the positive direction (i.e., towards the front of the module base) the required force decreases and approaches zero. Similarly, as the displacement decreases in the negative direction (i.e., towards the back of the module base) the required force further increases, approaching 39 mN.

The focus position may be defined based on the current direction and strength within one or more positioning coil assemblies, such as a pair of positioning coil assemblies. For example, in this regard, the lens barrel assembly may be positioned at a default position under no current to the pair of positioning coil assemblies (e.g., in a non-powered state). Further, in this regard, the lens barrel assembly may be positioned at a maximal forward position when a first maximal current strength in a first direction is applied to the pair of positioning coil assemblies (e.g., a first powered state). Similarly, in this regard, the lens barrel assembly may be positioned at a maximal backward position when a second maximal current strength in a second direction is applied to the pair of positioning coil assemblies (e.g., a second powered state).

By distributing the various required forces to position the lens barrel assembly at the front, back, or neutral focus position within the module base, the variable focus lens assembly is designed to quickly position the lens barrel assembly to the extreme positions by rapidly altering the exerted magnetic force. In this regard, for example, one or more positioning coil assemblies may be manipulated to exert zero or near-zero magnetic force, such as the lowest possible magnetic force, to position the lens barrel assembly at a near focus position as close to the front of the module base as possible, and for example furthest from an image sensor. Similarly, one or more positioning coil assemblies may be manipulated to exert a maximum magnetic force, or near-maximum magnetic force, to position the lens barrel assembly at a far focus position as close to the back of the module base as possible, and for example closest to a corresponding image sensor. Further, one or more positioning coil assemblies may be manipulated to exert an intermediate, target magnetic force to position the lens barrel assembly at a neutral focus position towards the middle of the module base. In this regard, the variable focus lens assembly may be designed to quickly exert the necessary force to enable displacement of the lens barrel assembly to translate to at least these three discrete focus positions. It should be appreciated that, in other embodiments, a variable focus lens assembly may be configured to exert the necessary force to enable displacement of the lens barrel assembly to translate to any number of other focus positions.

Having described various possible implementations of variable focus lens assemblies, and the various details thereof, additional description is provided regarding apparatuses integrating at least one variable focus lens assembly. It should be appreciated that, in some embodiments, one or more of the of the apparatuses as described may include one variable focus lens assembly, for example to replace far-field imaging optics. Alternatively or additionally, in some embodiments, one or more of the apparatuses may include a plurality of variable focus lens assemblies, for example at least a first to replace far-field imaging optics and a second to replace near-field imaging optics. As such, the specific embodiments described and/or depicted herein should not limit the scope and spirit of the disclosure.

FIGS. 12 and 13 illustrate an example variable focus multi-sensor imaging engine including a variable focus lens assembly. Specifically, FIG. 12 depicts a front perspective view 1200 of a variable focus multi-sensor imaging engine. FIG. 13 depicts a back perspective view 1300 of the variable focus multi-sensor imaging engine.

The variable focus multi-sensor imaging engine illustrated in FIGS. 12 and 13 includes various hardware configured to enable capture, transmission, and/or processing of one or more image data objects. For example, the variable focus multi-sensor imaging engine may be configured to capture a near-field image data object representing a near-field of view and capture a far-field image data object representing a far-field of view. Additionally or alternatively, the variable focus multi-sensor imaging engine may be configured to produce one or more illuminations for capturing such image data objects. Specifically, as illustrated, the variable focus multi-sensor imaging engine includes a near-field lens assembly (1202, 1302) associated with a near-field image sensor 1204. The near-field lens assembly and near-field image sensor may form a near-field imager configured to receive light from a particular near-field of view and capture said light in a near-field image data object that represents the near-field of view from the perspective of the near-field imager.

Similarly, the variable focus multi-sensor imaging engine includes the variable focus lens assembly 100 associated with a variable focus image sensor 1206. In this regard, the variable focus lens assembly 100 and variable focus image sensor 1206 form a far-field imager configured to receive light from a particular far-field of view and capture said light in a far-field image data object that represents the far-field of view from the perspective of the far-field imager. In this regard, the variable focus lens assembly 100 may be manipulated, for example via one or more activation signals, to position a lens barrel assembly at various focus positions when desired, for example to configure the variable focus lens assembly 100 for focusing for capturing representations of objects at a particular determined and/or predetermined focus range.

The variable focus multi sensor imaging engine further includes integrated illumination-aimer optics (1208, 1308). In this regard, the integrated illumination-aimer optics may be designed to produce one or more illumination patterns based on incoming light received from one or more illuminator sources (not depicted) of the variable focus multi-sensor imaging engine. For example, the integrated illumination-aimer optics may be associated with illumination optics located underneath the integrated illumination-aimer optics. Additionally or alternatively, in some embodiments, the integrated illumination-aimer optics is configured to receive an aimer illumination and project a corresponding aimer pattern based on one or more aimer subassemblies of the integrated illumination-aimer optics.

The variable focus multi-sensor imaging engine further includes an imaging board 1310. The imaging board (1210, 1310) that includes hardware, circuitry, and/or the like, configured to power and/or enable activation of one or more associated components connected with the imaging board. For example, in some embodiments, the imaging board is connected to at least the near-field image sensor (1204, 1304), image sensor (1206), one or more illuminator sources of the variable focus multi-sensor imaging engine, and/or one or more aimer sources of the variable focus multi-sensor imaging engine. In this regard, the imaging board (1210, 1310) may enable activation of each of these components, for example to activate the near-field image sensor 1304 and/or 1306 to cause capture of an image data object. In some such circumstances, the imaging board further transmits such captured image data objects from the image sensor(s) 1306 and/or 1304 to one or more processors and/or other hardware connected to the variable focus multi-sensor imaging engine. Additionally or alternatively, in some embodiments, the imaging board is connected to at least the variable focus lens assembly 100, for example to provide power to and/or otherwise activate one or more coil positioning subassemblies to a desired powered state. In some embodiments, the imaging board is connected with one or more external processors and/or other circuitry for performing such functionality. In some embodiments, the imaging board is embodied by one or more printed circuit board(s). For example, in at least one example embodiment, the imaging board includes a flexible printed circuit board configured to connect various layers on which one or more other components of the variable focus multi-sensor imaging engine may be mounted and/or otherwise connected.

In this regard, the variable focus lens assembly 100 may provide variable focusing to the variable focus multi-sensor imaging engine within a range of focus positions based on the design of the variable focus lens assembly 100. For example, in at least some embodiments, the variable focus lens assembly 100 is configured for positioning at a near focus position, a neutral focus position, and a far focus position. In some such embodiments, the variable focus lens assembly 100 may include one or more activation signals to power one or more coil positioning assemblies as determined appropriate to reposition a lens barrel assembly within the variable focus lens assembly 100 to a desired focus position for capturing one or more image data objects.

In some embodiments, the variable focus lens assembly 100 receives power from one or more components of the variable focus multi-sensor imaging engine. For example, in some embodiments, the variable focus lens assembly 100 is connected to coil powering circuitry embodied in the variable focus multi-sensor imaging engine, such that the coil powering circuitry provides power to the variable focus lens assembly 100. In this regard, the coil powering circuitry may set the variable focus lens assembly 100 to a powered state by providing a certain value of power (e.g., current and/or voltage) to the variable focus lens assembly 100 and/or subcomponents thereof, such as one or more positioning coil assemblies. In some embodiments, the coil powering circuitry is embodied by the imaging board (1210, 1310), or at least a portion thereof. In this regard, the variable focus lens assembly 100 may be integrated with and/or otherwise connected to the imaging board (1210, 1310), which may receive one or more instructions from an included and/or associated processor for providing a determined value of power to the variable focus lens assembly 100.

In some embodiments, the variable focus multi-sensor imaging engine may be included in one or more imaging apparatuses. For example, in this regard, FIGS. 14A, 14B, and 14C illustrate an example variable focus multi-sensor imaging apparatus 1400, in accordance with at least some example embodiments of the present disclosure. Specifically, FIG. 14A depicts the variable focus multi-sensor imaging apparatus 1400 from a front perspective view. FIG. 14B depicts the variable focus multi-sensor imaging apparatus 1400 from a top-down orthogonal view. FIG. 14C depicts the variable focus multi-sensor imaging apparatus 1400 from a front orthogonal view.

As illustrated, the variable focus multi-sensor imaging apparatus 1400 includes the variable focus multi-sensor imaging engine 1200 housed within a particular apparatus chassis 1402. In this regard, the apparatus chassis 1402 may be configured to fit each of the components described with respect to the variable focus multi-sensor imaging engine 1200. For example, in this regard, the apparatus chassis 1402 may be designed and/or modified to define a variable focus lens assembly space 1404, such as is illustrated in FIG. 15. The variable focus lens assembly space 1404 may be configured to fit the variable focus lens barrel assembly, for example variable focus lens barrel assembly 100, within the defined variable focus lens assembly space 1404. In some embodiments, the apparatus chassis 1402 comprises an existing apparatus chassis locally modified to define the variable focus lens assembly space 1404. In this regard, the variable focus lens assembly may be implemented in the variable focus multi-sensor imaging apparatus without affecting the other configurations of the variable focus mufti-sensor imaging engine 1200, 1300. Additionally or alternatively, in some embodiments, the apparatus chassis 1402 is designed to enable removal and/or replacements of the variable focus lens assembly 100 without requiring dismantling the entirety of the variable focus multi-sensor imaging apparatus 1400. For example, as illustrated in FIG. 15, in some embodiments the variable focus lens assembly 100 may be readily removed from the variable focus lens assembly space 1404 and/or inserted into the variable focus lens assembly space 1404 for operation. In some such implementations, the variable focus lens assembly space 1404 includes one or more hardware support structures, protrusions, and/or the like configured to engage the variable focus lens assembly within the variable focus lens assembly space 1404 and/or otherwise enable connection between the variable focus lens assembly and one or more components of the variable focus multi-sensor imaging engine 1200, 1300, such as an imaging board.

In some embodiments, a variable focus lens assembly is designed to fit in a minimal form factor apparatus. For example, in this regard, in some embodiments, the variable focus lens assembly 100 is designed to fit within an apparatus chassis 1402 for use within a small form factor mobile imaging engine. The overlapping and compact nature of the variable focus lens assembly 100 enables the assembly to fit within height restricted form factors commonly associated with such mobile imaging environments. For example, in some embodiments, the variable focus lens assembly 100 is designed with a height of less than 7 millimeters, such that the variable focus lens assembly 100 may fit within a variety of conventional mobile imaging apparatus chasses.

Such imaging apparatuses may further be integrated in any number of larger apparatuses, housings, and/or the like.

For example, FIG. 16 illustrates a perspective view of an example mobile variable focus multi-sensor imaging apparatus 1600. The mobile variable focus multi-sensor imaging apparatus 1600 includes a mobile apparatus chassis designed to fit one or more sub-apparatuses and/or sub-assemblies therein. For example, as illustrated, the mobile variable focus multi-sensor imaging apparatus 1600 includes a cell phone mobile apparatus chassis 1602. The cell phone mobile apparatus chassis 1602 may be a small form factor apparatus chassis, for example such that the chassis is limited based on a restricted apparatus height. In some such embodiments, for example, the cell phone mobile apparatus chassis 1602 includes a conventional mobile apparatus chassis associated with an apparatus height of approximately 7 millimeters, for example 6.8-7.5 mm.

Further, as illustrated, the mobile variable focus multi-sensor imaging apparatus 1600 includes the variable focus multi-sensor imaging apparatus 1400. In this regard, the variable focus multi-sensor imaging apparatus 1400 may be designed with a sufficiently small form factor to fit within the cell phone mobile apparatus chassis 1602 despite the restricted apparatus height. For example, in this regard the variable focus multi-sensor imaging apparatus 1400 may be designed with a height of 6.8 mm. Further, the variable focus lens assembly therein includes a minimized profile sufficient for fitting within the variable focus multi-sensor imaging apparatus 1400, while the specific design details enable the assembly to response within a desired response rate and without being susceptible to vibrations and/or impact due to the securing of the components, for example using one or more bearing balls, and minimal physically engaging components for moving the lens barrel assembly therein.

Having described various aspects of variable focus lens assemblies and associated apparatuses, additional description is provided with respect to assembly of one or more variable focus lens assemblies in accordance with at least some example embodiments herein. It should be appreciated that, in this regard, operations for assembling a variable focus lens assembly as described herein provide a particular process, which may be utilized to create a particular machine for utilization as described herein. Additionally or alternatively, it should be appreciated that one or more operations and/or subprocesses of the processes described may be implemented in any order, such that embodiment processes may include one or more steps in orders other than described and/or depicted. As such, the specific implementations as depicted and/or described should not limit the scope and spirit of this disclosure.

FIG. 17 illustrates a flowchart depicting example operations of an example process 1900 for assembling a variable focus lens assembly, in accordance with at least some example embodiments of the present disclosure. In some embodiments, a machine operator performs some or all of the depicted operations.

The process 1700 begins at block 1702. Block 1702 includes assembling a lens barrel, a pair of positioning magnets, and an imaging lens to form a lens barrel assembly. Additionally, in at least some such embodiments, the lens barrel assembly comprises a first positioning magnet of the pair of positioning magnets mounted opposite a second positioning magnet of the pair of positioning magnets. In some embodiments, each positioning magnet is mounted using one or more adhesive and/or chemical securing means. In other embodiments, each positioning magnet is physically secured by engaging with the lens barrel. Additionally or alternatively, the lens barrel assembly also includes a plurality of bearing slots carved into a surface of the housing of the lens barrel assembly. In some embodiments, the process for assembling the lens barrel, the pair of positioning magnets, and the imaging lens to form the lens barrel assembly includes one or more subprocesses, for example process 1800 as described below with respect to FIG. 18.

Block 1704 includes fitting each of the bearing slots of the lens barrel assembly with a bearing ball. In this regard, the bearing ball may be selected from any of a myriad number of options described earlier. In some non-limiting example embodiments, the lens barrel assembly may comprise only four bearing slots. As such, only four bearing balls, one in each slot, may be inserted into the four bearing slots.

Block 1706 includes inserting the bearing ball fitted lens barrel assembly into a module space defined by a module base. The module space may be defined based on one or more outer structures of the module base, for example one or more walls, such that the module space defines an inner enclosure defined by the structure of the module base. In some embodiments, the module space is defined with sufficient volumetric dimensions to enable the lens barrel assembly to fit within the defined module space. Additionally or alternatively, in some embodiments, the module base includes a plurality of bearing slots for positioning and/or aligning the lens barrel assembly within the module base, as described.

Block 1708 includes engaging at least two pairs of the bearing balls with the lens barrel assembly through the bearing slots of the module base. In some embodiments each of the bearing balls engages a corresponding bearing slot each of the lens barrel assembly and the module base. In this regard, the lens barrel assembly may be engaged such that the lens barrel assembly may slide along a depth of the bearing slots in the lens barrel assembly when force is applied to the lens barrel assembly, to reposition within the module base.

Block 1710 includes assembling a first positioning coil assembly and a second positioning coil assembly. In this regard, each positioning coil assembly may include at least a positioning coil and a corresponding positioning pad. The positioning coil assembly may be assembled for attaching to one or more other components as described. In some embodiments, the process for assembling the first positioning coil assembly and/or the second positioning coil assembly includes one or more subprocesses, for example process 1900 as described below with respect to FIG. 19.

Block 1712 includes attaching, on the module base, the first positioning coil assembly and the second positioning coil assembly. The first positioning coil assembly may be positioned opposite the second positioning coil assembly, for example such that the first positioning coil assembly is located at a coil location on a top surface of the module base and the second positioning coil is located at a second coil location opposite the first coil location on a bottom surface of the module base. In other embodiments, the first positioning coil assembly and/or second positioning coil assembly are attached on the module base through attaching the first positioning coil assembly and/or the second positioning coil assembly to a positioning coil board and attaching the positioning coil board to the module base.

FIG. 18 illustrates a flowchart depicting example operations of an example process 1800 for assembling a lens barrel, a pair of positioning magnets, and an imaging lens to form a lens barrel assembly, in accordance with at least some example embodiments of the present disclosure. In some embodiments, a machine operator performs some or all of the depicted operations.

The process 1800 begins at block 1802. Block 1802 includes mounting the pair of positioning magnets to a housing of the lens barrel to form a barrel-magnet assembly. As described, the pair of positioning magnets may be mounted opposite one another, for example with a first positioning magnet located on top of the lens barrel and a second positioning magnet located on bottom of the lens barrel. Further as described, each of the positioning magnets may be mounted utilizing physical means and/or chemical means, such as one or more epoxies, adhesives, and/or the like.

Block 1804 includes inserting the imaging lens within the barrel-magnet assembly to form the lens barrel assembly. In some embodiments, the lens barrel is designed to include a front aperture and a back aperture to enable light to traverse through the lens barrel. In some embodiments, the imaging lens matches, or substantially matches, the aperture shape sufficient to maintain the position of the imaging lens within the imaging barrel. For example, in an example context where the lens barrel defines a circular aperture of a particular diameter, the imaging lens may similarly include a circular and/or cylindrical design matching the diameter of the aperture, or slightly smaller sufficient to fit the imaging lens within the aperture. In some embodiments, one or more adhesives and/or physical means are utilized to secure the imaging lens within the barrel-magnet assembly. For example, in some embodiments, the barrel lens defines a slot configured to receive the imaging lens when the imaging lens is positioned and/or aligned properly. Upon completion of block 1804, in some embodiments, flow returns to one or more other blocks of the flows as described and/or illustrated. For example, in some embodiments, flow returns to block 1704 to continue the process described above with respect to FIG. 17.

FIG. 19 illustrates a flowchart depicting example operations of an example process 1900 for assembling a positioning coil assembly, in accordance with at least some example embodiments of the present disclosure. It should be appreciated that the process may be repeated for any number of positioning coil assemblies, for example for a first coil assembly and a second coil assembly. In some embodiments, a machine operator performs some or all of the depicted operations.

The process 1900 begins at block 1902. In some embodiments, block 1902 begins after one or more blocks as depicted and/or described with respect to the other flowcharts herein, for example after block 1708 as depicted with respect to FIG. 17. Block 1902 includes inserting a positioning pad into a coil inner region defined by a positioning coil to form a coil-pad assembly. In some embodiments, a positioning coil embodies one or more wound wires, such that the wound wires surround the coil inner region. Accordingly, a positioning pad may be of a sufficient size to fit within the coil inner region defined by the positioning coil. In some embodiments, the positioning pad is secured within the coil inner region by any of a number of known physical and/or chemical means.

Block 1904 includes attaching a flex connector to the coil-pad assembly to form the positioning coil assembly. In some embodiments, a flex connector includes one or more printed circuit boards, hardware, and/or other circuitry configured to enable connection of the positioning coil to a powering and/or controlling hardware. For example, in some embodiments, the flex connector includes a flexible printed circuit board to enable connection of the positioning coil assembly with one or more circuits, hardware, and/or the like configured to power the positioning coil to a powered state. In some embodiments, the flex connector is attached to the underside of the positioning coil by any of a number of known physical and/or chemical means. In some such embodiments, the flex connector may be utilized to connect the positioning coil assembly to hardware for powering the positioning coil, and/or associated hardware further connected to such powering hardware.

Upon completion of block 1904, in some embodiments, flow returns to one or more other blocks of the flows as described and/or illustrated. For example, in some embodiments, flow returns to block 1710 to continue the process described above with respect to FIG. 17.

It should be appreciated that the example implementations described herein are each non-limiting examples of various embodiments of the present disclosure. In this regard, one or more enhancements implemented in the various embodiments may be provided in any combination. Additionally or alternatively, in some embodiments, one or more components may be provided with modifications as described herein.

For example, some embodiments may provide for any number of focus positions, and others may provide for a limited number of variable focus positions (e.g., a far focus position, a neutral focus position, and a near focus position). Additionally or alternatively, embodiment imaging apparatuses may include any number of variable focus lens assemblies each configured in any of a number of ways, for example within different variable focus positions. Such implementations are intended to be covered by the disclosure herein and the scope of the appended claims provided herein.

The embodiments disclosed have been described with certain example configurations and/or implementation details. It should be appreciated that in other embodiments, for example, components may be embodied by other materials known in the art for creating such components and/or structural equivalents. Further, it should be appreciated that embodiments may include any number of known structural elements, or utilize known methodologies, for securing the components and/or sub-components thereof (e.g., for securing one or more LEDs, or other components, to a circuit board or other printed circuit board) without deviating from the scope and spirit of the disclosure.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel operations may be advantageous. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve the desirable results described and/or claimed.

What is claimed is:

1. An optical assembly, comprising:
   a module base;
   an lens barrel assembly configured to move within the module base, the lens barrel assembly having two front tubular slots and two rear tubular slots;
   only two front bearing balls, each housed in a respective one of the two front tubular slots and configured to movably support the lens barrel assembly within the module base at a first side of the lens barrel assembly; and
   only two rear bearing balls, each housed in a respective one of the two rear tubular slots and configured to movably support the lens barrel assembly within the module base at a second side of the lens barrel assembly,
   wherein the only two front bearing balls are in a crossed positional arrangement with respect to the only two rear bearing balls such that each corner of the lens barrel assembly receives only one bearing ball when viewed along an optical axis of the optical assembly.

2. The optical assembly of claim 1, wherein each of the two front tubular slots are opposite to each other on the first side of the lens barrel assembly.

3. The optical assembly of claim 1, wherein each of the two rear tubular slots are opposite to each other on the second side of the lens barrel assembly.

4. The optical assembly of claim 1, further comprising:
   a wired coil board configured to produce a magnetic flux upon energization,
   wherein the lens barrel assembly further comprises at least one positioning magnet on at least a portion of the lens barrel assembly such that at all movement positions of the lens barrel assembly, the at least one positioning magnet is in interactable proximity of the magnetic flux produced by the wired coil board.

5. The optical assembly of claim 4, wherein the wired coil board comprises at least one wired coil assembly configured to move at least a part of the lens barrel assembly within a recessed portion defined by the wired coil board, based on a first current supplied to the wired coil assembly.

6. The optical assembly of claim 4, wherein the wired coil board comprises a wired coil assembly configured to move at least a part of the lens barrel assembly out of a recessed portion defined by the wired coil board, based on a second current supplied to the wired coil assembly.

7. The optical assembly of claim 4, wherein a first end of the module base is towards a front side of the optical assembly that faces a scene to be imaged and a second end of the module base is towards a rear end of the optical assembly that faces an image sensor, and wherein the wired coil board is positioned towards the rear end of the optical assembly.

8. The optical assembly of claim 4, wherein the wired coil board comprises a wired coil assembly configured to move the lens barrel assembly upon energization and wherein the movement of the lens barrel assembly varies a focus of the optical assembly.

9. The optical assembly of claim 8, wherein the wired coil assembly is configured to exert an electromagnetic force on the lens barrel assembly to move the lens barrel assembly along a direction parallel to an optical axis of the optical assembly.

10. The optical assembly of claim 1, further comprising:
    a wired coil board having a first set of windings and a second set of windings,
    wherein the first set of windings and the second set of windings define a recessed portion therebetween to accommodate a rear portion of the lens barrel assembly,
    wherein a first plane containing the first set of windings is parallel to a second plane containing the second set of windings, wherein a normal vector of the first and the second plane is orthogonal to an optical axis of the optical assembly; and
    wherein the optical axis of the optical assembly bisects a line joining centers of the first plane and the second plane.

11. The optical assembly of claim 10, wherein the lens barrel assembly further comprises a first positioning magnet and a second positioning magnet placed opposite to the first positioning magnet on an open frame lens barrel assembly of the lens barrel assembly.

* * * * *